United States Patent [19]
McMahan

[11] Patent Number: 5,835,967
[45] Date of Patent: Nov. 10, 1998

[54] ADJUSTING PREFETCH SIZE BASED ON SOURCE OF PREFETCH ADDRESS

[75] Inventor: Steven C. McMahan, Richardson, Tex.

[73] Assignee: Cyrix Corporation, Richardson, Tex.

[21] Appl. No.: 607,673

[22] Filed: Feb. 27, 1996

Related U.S. Application Data

[63] Continuation-in-part of Ser. No. 324,992, Oct. 18, 1994, abandoned, which is a continuation-in-part of Ser. No. 138,783, Oct. 18, 1993, abandoned.

[51] Int. Cl.$^6$ ........................................................ G06F 9/38
[52] U.S. Cl. ............................ 711/213; 395/383; 395/584
[58] Field of Search .............................. 395/383, 421.03, 395/584; 711/213, 219

[56] References Cited

U.S. PATENT DOCUMENTS

| | | | |
|---|---|---|---|
| 5,146,578 | 9/1992 | Zangenehpour | 711/137 |
| 5,327,536 | 7/1994 | Suzuki | 395/585 |
| 5,394,530 | 2/1995 | Kitta | 395/587 |
| 5,442,756 | 8/1995 | Grochowski et al. | 395/585 |
| 5,459,847 | 10/1995 | Okamura | 711/213 |

*Primary Examiner*—Eddie P. Chan
*Assistant Examiner*—Kevin Verbrugge
*Attorney, Agent, or Firm*—Andrew S. Viger; John L. Maxin

[57] ABSTRACT

A prefetch unit is used, in an exemplary embodiment, in a superscalar, superpipelined microprocessor compatible with the x86 instruction set architecture. Normally, the prefetch unit performs split prefetching by generating low and high prefetch addresses in a single clock, with the high prefetch address being generated from the low prefetch address by incrementation. In cases where the low prefetch address is supplied to the prefetch unit too late in a clock period to generate the high prefetch address, such as where a branch instruction is not detected by a branch processing unit so that the target instruction address (i.e., the low prefetch address) is supplied by an address calculation stage, the prefetch unit generates a prefetch request consisting of only the low prefetch address. In an exemplary embodiment each prefetch request is for an 8 byte block of instruction bytes, such that the high prefetch address is generated by adding an 8-bit value to the low prefetch address, and, for low prefetch addresses supplied late, the prefetch unit detects whether the low prefetch address has a [0] in bit position 3, and if so, generates the high prefetch address by toggling the bit position n to a [1] (because the no carry ripple will affect the higher order bits).

9 Claims, 18 Drawing Sheets

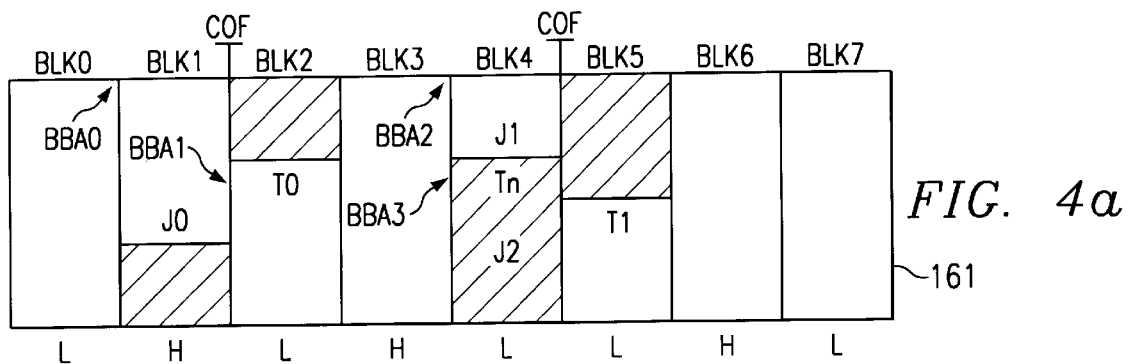
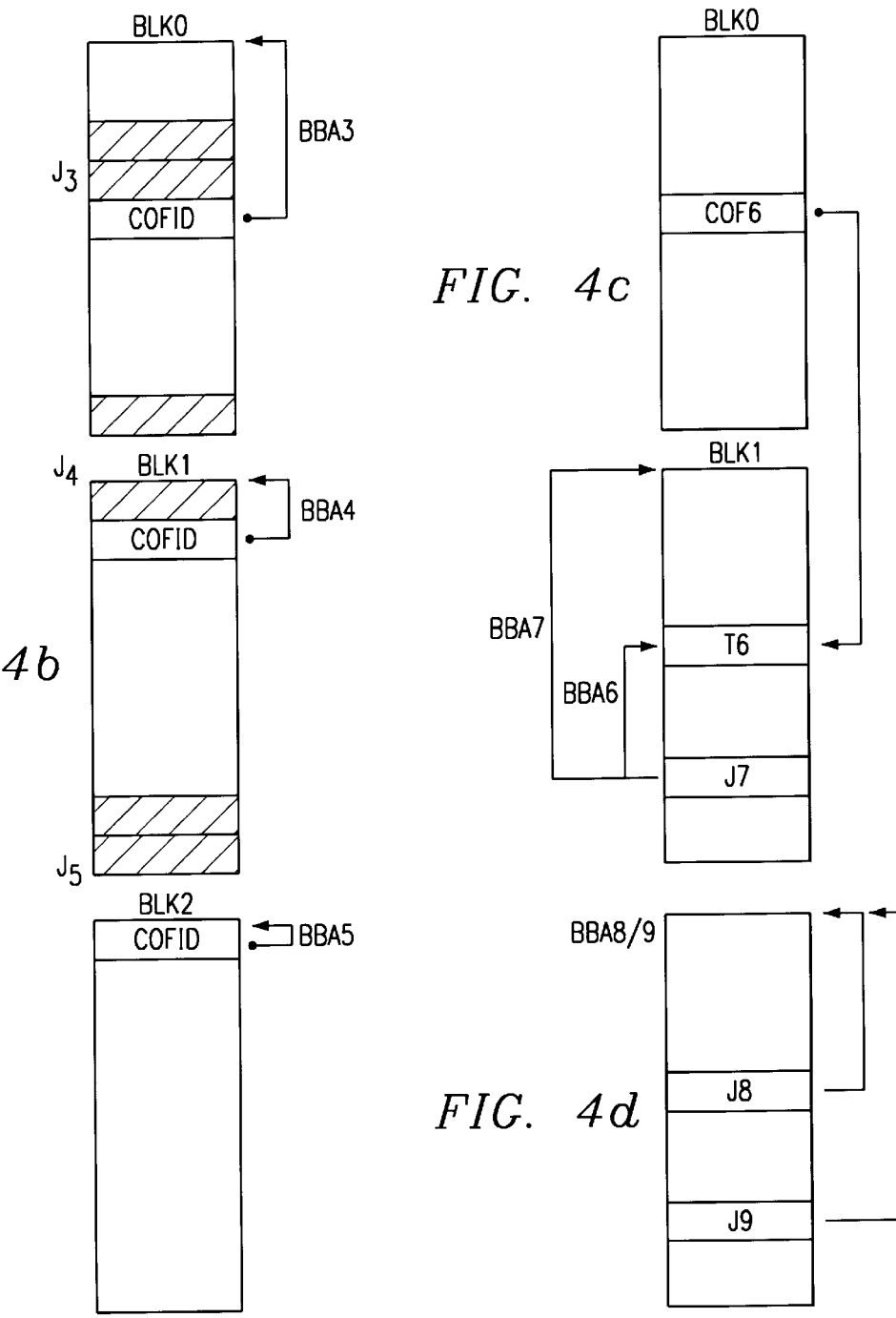
FIG. 4a
FIG. 4b
FIG. 4c
FIG. 4d 0,1 = PREDICTED NOT TAKEN
2,3 = PREDICTED TAKEN
T = ACTUAL TAKEN
NT = ACTUAL NOT TAKEN

TARGET CACHE READ PH1

TARGET CACHE WRITE PH2

HISTORY CACHE READ PH1

HISTORY CACHE WRITE PH2

FIG. 8b
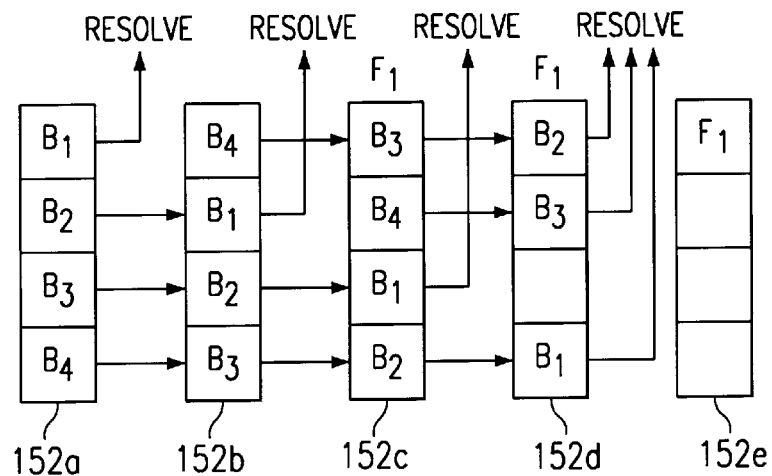
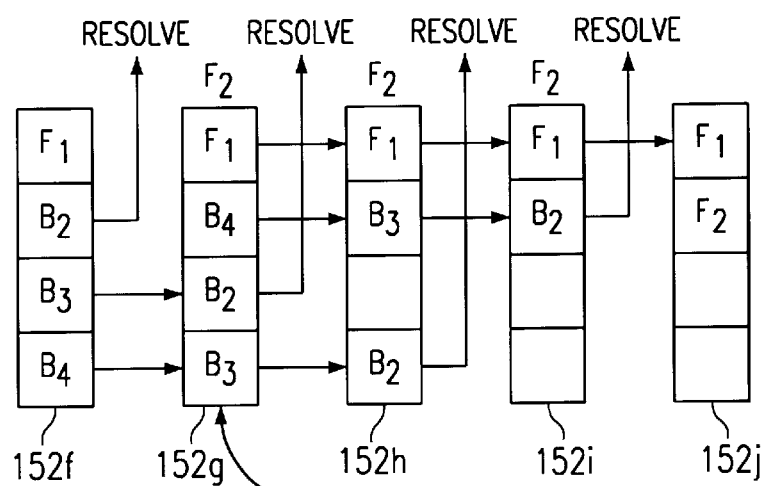
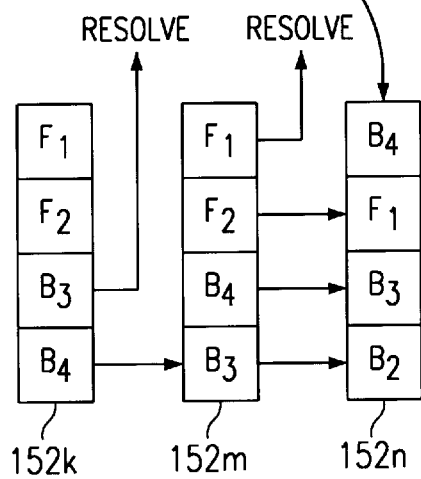

FIG. 9

| 200 | Physical Register 0 | Physical Register 1 | Physical Register 2 | | Physical Register 31 | |
|---|---|---|---|---|---|---|
| Logical ID Reg | LogID[2:0] | LogID[5:3] | LogID[8:6] | • • • | LogID[98:96] | 210 |
| Size Reg | Size[1:0] | Size[3:2] | Size[5:4] | • • • | Size[65:64] | 212 |
| Current Reg | Current[0] | Current[1] | Current[2] | • • • | Current[31] | 214 |
| Pending Reg | Pending[0] | Pending[1] | Pending[2] | • • • | Pending[31] | 216 |
| Chkpnt 0 Reg | Chkpnt0[0] | Chkpnt0[1] | Chkpnt0[2] | • • • | Chkpnt0[31] | |
| Chkpnt 1 Reg | Chkpnt1[0] | Chkpnt1[1] | Chkpnt1[2] | • • • | Chkpnt1[31] | 218 |
| Chkpnt 2 Reg | Chkpnt2[0] | Chkpnt2[1] | Chkpnt2[2] | • • • | Chkpnt2[31] | |
| Chkpnt 3 Reg | Chkpnt3[0] | Chkpnt3[1] | Chkpnt3[2] | • • • | Chkpnt3[31] | |
| AC1x Reg | AC1x[0] | AC1x[1] | AC1x[2] | • • • | AC1x[31] | |
| AC1y Reg | AC1y[0] | AC1y[1] | AC1y[2] | • • • | AC1y[31] | |
| AC2x Reg | AC2x[0] | AC2x[1] | AC2x[2] | • • • | AC2x[31] | 220 |
| AC2y Reg | AC2y[0] | AC2y[1] | AC2y[2] | • • • | AC2y[31] | |
| EXx Reg | EXx[0] | EXx[1] | EXx[2] | • • • | EXx[31] | |
| EXy Reg | EXy[0] | EXy[1] | EXy[2] | • • • | EXy[31] | |
| Reg Busy Reg | RegBusy[0] | RegBusy[1] | RegBusy[2] | • • • | RegBusy[31] | 222 |

ADJUSTING PREFETCH SIZE BASED ON SOURCE OF PREFETCH ADDRESS

CROSS REFERENCES

This application is a continuation-in-part of U.S. patent application Ser. No. 08/324,992, titled "Branch Processing Unit", filed Oct. 18, 1994, now abandoned, which is a continuation-in-part of U.S. patent application Ser. No. 08/138,783, filed Oct. 18, 1993, now abandoned. This application incorporates by reference the subject matter of U.S. patent applications (1) Ser. Nos. 08/605,344, titled "Speculative Execution In A Pipelined Processor", filed Feb. 14, 1996, now abandoned, (2) Ser. No. 08/526,125, titled "Pipelined Processor With Independent Instruction Issuing", filed Sep. 8, 1995, now abandoned, and (3) Ser. No. 08/138, 654, titled "Control of Data for Speculation Execution and Exception Handling in a Microprocessor with Write Buffer", filed Oct. 18, 1993, now U.S. Pat. No. 5,584,009 all assigned to the assignee of this application.

BACKGROUND

1. Technical Field

The invention relates generally to pipelined digital processors, and more particularly to instruction prefetch.

In even greater particularity, the invention relates to prefetching target instructions to support branch processing.

In an exemplary embodiment, the invention is used in connection with the prefetch and branch processing units of a superscalar, pipelined microprocessor compatible with the x86 instruction set architecture.

2. Related Art

Computers commonly employ pipeline techniques to reduce the average execution time per instruction. An execution pipeline is divided into pipe stages—instructions are executed in stages allowing multiple instructions to be overlapped in the execution pipeline. The performance goal is for each pipe stage to complete all associated operations on an instruction in a clock cycle, such that instructions continuously advance to the next pipe stage and an instruction completes execution each clock cycle.

Pipeline performance is significantly affected by hazards that prevent a pipe stage from completing its operations in a single clock cycle, thereby causing pipe stalls or bubbles. Three general classes of pipeline hazards are: (a) structural hazards which arise from hardware resource conflicts; (b) data hazards which arise from dependency of an instruction on the results of a previous instruction; and (c) control hazards which arise from instructions that change the flow of the instruction stream.

Change of flow (COF) hazards interrupt the code stream, significantly impacting pipeline performance—COFs typically account for 15–30% of the instruction mix. For example, in the x86 instruction set architecture, COFs occur on the average every four to six instructions. COF instructions include branches (including loops), jumps, and call/returns—branches are conditional in that the branch may be taken or not taken (depending, for example, on the status of condition codes), while jumps and call/returns are unconditional (always taken). Taken branches and unconditional COFs (UCOFs) interrupt the instruction stream to cause instruction fetch to proceed from the target address.

Without limiting the scope of the invention, this background information is provided in the context of a problem to which the invention has application: improving instruction prefetch operations in connection with branch processing.

With respect to branches, schemes that predict branch direction may be static or dynamic. Static branch prediction typically uses a taken/not taken switch embedded in the opcode at compile time to predict the branch—that is, a given branch is predicted as either always taken or always not taken. Dynamic branch prediction involves using the past behavior (history) of branches that are executed repeatedly to make the prediction—numerous prediction algorithms are used, generally relying on the fact that most branches strongly favor either the taken or not taken direction.

Dynamic branch prediction schemes are of two general types: (a) branch prediction, and (b) branch target addressing. Branch prediction schemes commonly implement a prediction algorithm based on two prediction history bits (requiring a branch to be mispredicted twice before the prediction changes). Branch target addressing schemes use a target cache for storing the predicted address of the next instruction—either the fall through address for a branch predicted not taken, or the target address of a branch predicted taken.

Branch target addressing logic is commonly referred to as a branch target buffer (BTB). Each entry in the BTB's target cache typically includes (a) the address of the branch instruction which is used as a tag, (b) the associated predicted not-taken fall through address or the predicted taken target address for that branch instruction, and (c) an indication of whether the predicted address is for a taken or not-taken prediction (which is used to reduce the time to recover from a mispredicted branch). The BTB is accessed with undecoded instructions—if an instruction hits in the cache, the associated predicted address will be used to begin fetching the next instruction (i.e., prior to the decode of the branch instruction being complete).

The BTB also includes branch prediction and resolution logic for predicting whether a branch will be taken or not taken, and for resolving predicted branches and repairing mispredictions. The branch prediction logic implements a prediction algorithm based on history bits stored with the corresponding branch instruction entry in the target cache. The resolution logic receives inputs (such as condition codes), resolves whether the branch actually was or was not taken, and repairs mispredicted branches. Repair of mispredicted branches involves terminating execution of the instructions in the mispredicted direction, restoring the state of the machine, and restarting execution from the correct instruction—a branch misprediction results in a branch penalty corresponding to the number of clocks lost by mispredicting the branch rather than predicting the branch correctly.

Branch target buffers typically store target addresses for all changes of flow—branches and UCOFs. In the case of UCOFs, no prediction is required, but the stored target address can be used to immediately begin instruction fetch at the target address (i.e., without waiting for the COF to be decoded).

For the 32-bit and 64-bit X86 architectures (i.e., currently the 386, 486, and 586 generations), instructions can be from 1 to 15 bytes in length (the average instruction is about 2.5 bytes). As a result, instructions will be misaligned in memory. Instruction prefetch is used to provide a continuous flow of instructions for execution. Instruction bytes are prefetched from cache or memory and placed in a prefetch buffer. Instruction bytes are transferred to the decoder which first determines instruction length and then decodes the instruction—that is, instruction boundaries are not defined until the decode pipe stage.

Thus, from the standpoint of BTB design, if target address entries in the target cache are indexed using the address of the branch instructions, BTB access cannot occur until the decode stage. One scheme for accessing the BTB earlier, is to use the address (instruction pointer) of the instruction preceding a branch instruction as a tag associated with the address (instruction pointer) of the target instruction. When the instruction pointer for the instruction preceding the branch is defined (when that instruction begins decode), the BTB is accessed—if the access hits in the BTB, the target instruction address is used to prefetch the target instruction from an instruction cache.

This scheme for accessing the BTB is disadvantageous primarily because as a practical matter it requires a dedicated instruction cache to achieve the performance goal of prefetching the target by the time the branch completes decode. That is, to avoid pipeline bubbles between the branch instruction (n) and the target instruction (n+1), a prefetch request using the target address from the BTB must complete during the time the previous instruction (n−1) and the branch (n) are decoding Clk0 Decode n−1

BTB Access

Clk1 Decode Branch

Target Fetch

Clk2 Decode Target

This performance can only be consistently attained by using a dedicated instruction cache because instruction fetch from a unified code/data cache may be stalled by a pending data fetch. This requirement of separate code and data caches (referred to as a Harvard architecture) reduces cache design flexibility.

Branch processing places significant demands on instruction prefetch. Prefetching through changes of flow makes it more difficult to keep the code queue in the prefetch buffer full enough to continuously feed instruction bytes to the decoder. In particular, for unconditional COFs and predicted taken branches, the prefetcher will receive target addresses from different stages in the execution pipeline, with different timing delays affecting the time within a clock that the prefetcher has to generate the target prefetch address.

SUMMARY

An object of the invention is improve the performance of prefetch operations in general, and split prefetching in particular.

This and other objects of the invention are achieved by a prefetch unit that performs split prefetching by generating low and high prefetch addresses in a single clock, where the high prefetch address is generated from the low prefetch address, and where the low prefetch address is supplied to the prefetch unit from different sources with different timing delays.

In one aspect of the invention, the prefetch unit includes prefetch request logic that selectively issues prefetch requests for transferring a predetermined number of instruction bytes to the prefetch unit low/high incrementation logic increments the low prefetch address to generate the high prefetch address such that the low and high prefetch addresses are issued in the same clock.

The execution pipeline includes at least one pipe stage (AC in the exemplary embodiment) that supplies a low prefetch address to the prefetch unit with sufficient delay within a clock period that not enough time remains for the low/high incrementation logic to generate the high prefetch address in such clock period. When the low prefetch address is supplied to the prefetch unit by such at least one pipe stage, the prefetch request logic generates only the low prefetch address in the clock in which it receives the low prefetch address.

In another aspect of the invention, the high prefetch address is generated by adding an n-bit value equal to $2^n$ to the low prefetch address (in the exemplary embodiment, prefetch blocks are 8 bytes, such that the high prefetch address is generated by adding +8 [1000]). For low prefetch addresses supplied by the at least one pipe stage, the low/high incrementation logic detects whether the low prefetch address has a [0] in bit position n, and if so, generates the high prefetch address by toggling the bit position n to a [1].

Embodiments of the invention may be implemented to realize one or more of the following technical advantages of the invention. The branch processing unit is accessed with the prefetch address, prior to decode of the branch instruction, thereby decoupling branch processing from instruction issue which is particularly advantageous (a) for unified cache designs where data accesses and instruction prefetches compete for the cache, and (b) for superscalar processors, particularly as the number of execution pipes is increased beyond two, such that a branch and its target might be issued in the same clock.

The target cache uses banked addressing to support split-prefetching. The target cache stores target addresses for predicted taken branches and unconditional COFs (together with associated history bits), while a separate history cache is used to store history bits for predicted not-taken branches, thereby taking advantage of the normal fall through to supply the not-taken address, making more entries available in the target cache for storing predicted taken targets, and reducing the need to access multiple branches per prefetch.

For instruction prefetching, the prefetch unit generates low and high prefetch addresses in the same clock, and implements split prefetching. The high prefetch address is generated by incrementing the low prefetch address—if the low prefetch address is supplied by a later pipe stage, such as AC, with a delay that prevents incrementation to obtain the high prefetch address in the same clock, the high prefetch address is not generated by incrementation (although in one embodiment, it can be generated by toggling the bit position corresponding to the prefetch block boundary).

The branch processing system improves instruction prefetch, which in turn improves execution pipeline performance, and therefore overall computer system performance. Moreover, improved branch processing and instruction prefetch reduces the demands on cache and external memory resources that result from extraneous prefetch accesses that result form undetected or mispredicted COFs.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

BRIEF DESCRIPTION OF THE DRAWINGS

FIGS. 4a–4c illustrate prefetch buffer organization (with Low/High 8 byte blocks), including COF addressing using a basic block address (BBA).

FIG. 4d illustrates a situation in which the basic block address is assigned to two different COFs.

FIG. 8b illustrates a scheme for handling resolution of floating point speculation instructions that are allocated into the resolution logic to allow the speculative issue of instructions after the floating point instruction issues but before it resolves.

FIG. 9 illustrates the control registers in the register translation unit, and in particular the checkpoint registers used to support speculative execution.

DETAILED DESCRIPTION

The detailed description of an exemplary embodiment of technique for adjusting prefetch size based on the source of a prefetch address according to the invention is organized as follows:
1. Exemplary Processor System
   1.1. Microprocessor
   1.2. Processor System
2. Branch Processing
   2.1. Terminology
   2.2. Prefetch
      2.2.1. Prefetch Request
         2.2.1.1. Access UC/ILine
         2.2.1.2. UC Prioritization
      2.2.2. Prefetch Buffer
      2.2.3. COF Addressing
      2.2.4. COF Prefetching
         2.2.4.1. Predicted Path
         2.2.4.2. Not-Predicted Path
         2.2.4.3. Transfer to Decoder
      2.2.5. COF Confirmation
      2.2.6. PF Buffer Flow Control
      2.2.7. ICOF Instruction
   2.3. Branch Processing Unit
      2.3.1. Target Cache
         2.3.1.1. HI/LO Banking
         2.3.1.2. Read/Prioritization
         2.3.1.3. Write/Update
      2.3.2. History Cache
      2.3.3. Return Stack
      2.3.4. Far Targets
         2.3.4.1. Far Target Cache
         2.3.4.2. Target Cache
      2.3.5. Resolution Logic
   2.4. Branch Prediction
   2.5. Resolution and Repair
      2.5.1. Speculative Execution
      2.5.2. Floating Point Instructions
      2.5.2. Resolution
      2.5.2. Repair
3. Conclusion This organizational outline, and the corresponding headings used in this Detailed Description, are provided for convenience of reference only.

The exemplary prefetch unit is used to implement prefetch operations, including split prefetching, is used to implement branch prediction and target addressing functions in a superscalar, superpipelined microprocessor compatible with the x86 instruction set architecture (ISA). Detailed descriptions of conventional or known aspects of microprocessor systems are omitted so as to not obscure the description of the invention with unnecessary detail. In particular, certain terminology related to the x86 computer architecture (such as register names, signal nomenclature, etc.) is known to practitioners in the field of microprocessor design. Moreover, the terms "branch processing unit" or "BPU" are used even though the exemplary BPU is used to provide target addressing for unconditional changes of flow (jumps, calls, returns) as well as branches.

1. Exemplary Processor System

Figure 1A:
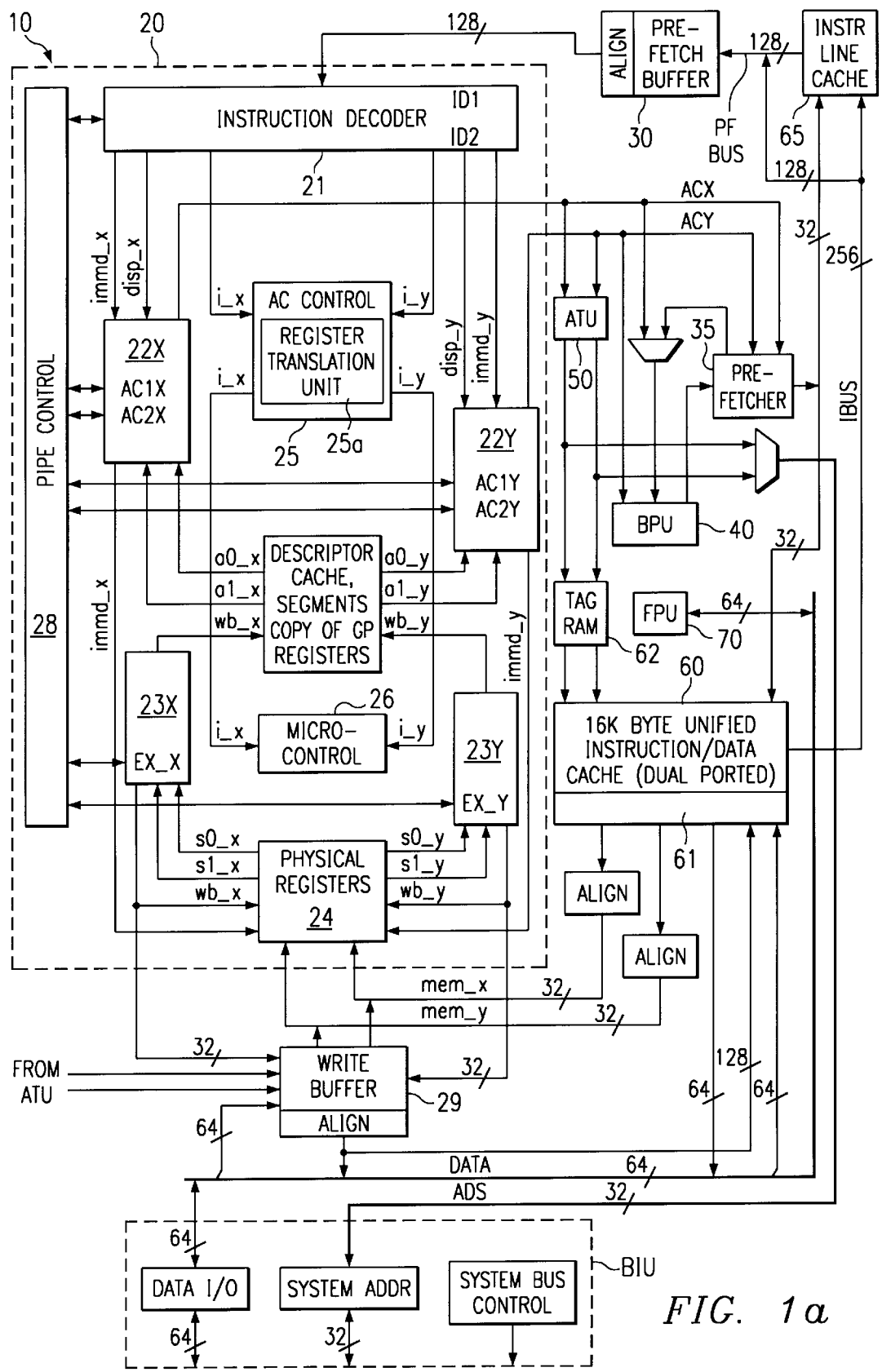
FIG. 1a illustrates a superpipelined, superscalar microprocessor according to the invention.
Figure 1B:
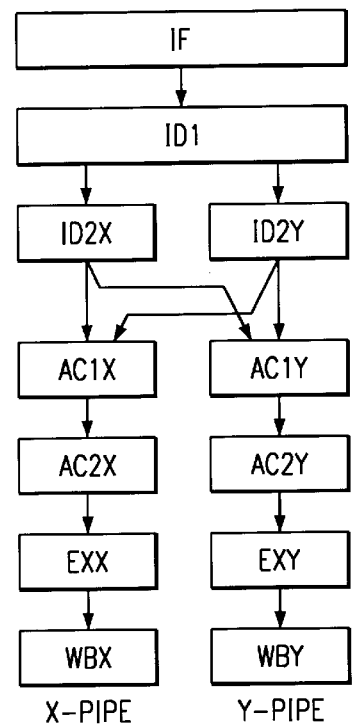
FIG. 1b illustrates the seven pipeline stages of the microprocessor, including the superpipelined ID and AC stages, and the superscalar X and Y execution pipes.
Figure 2:
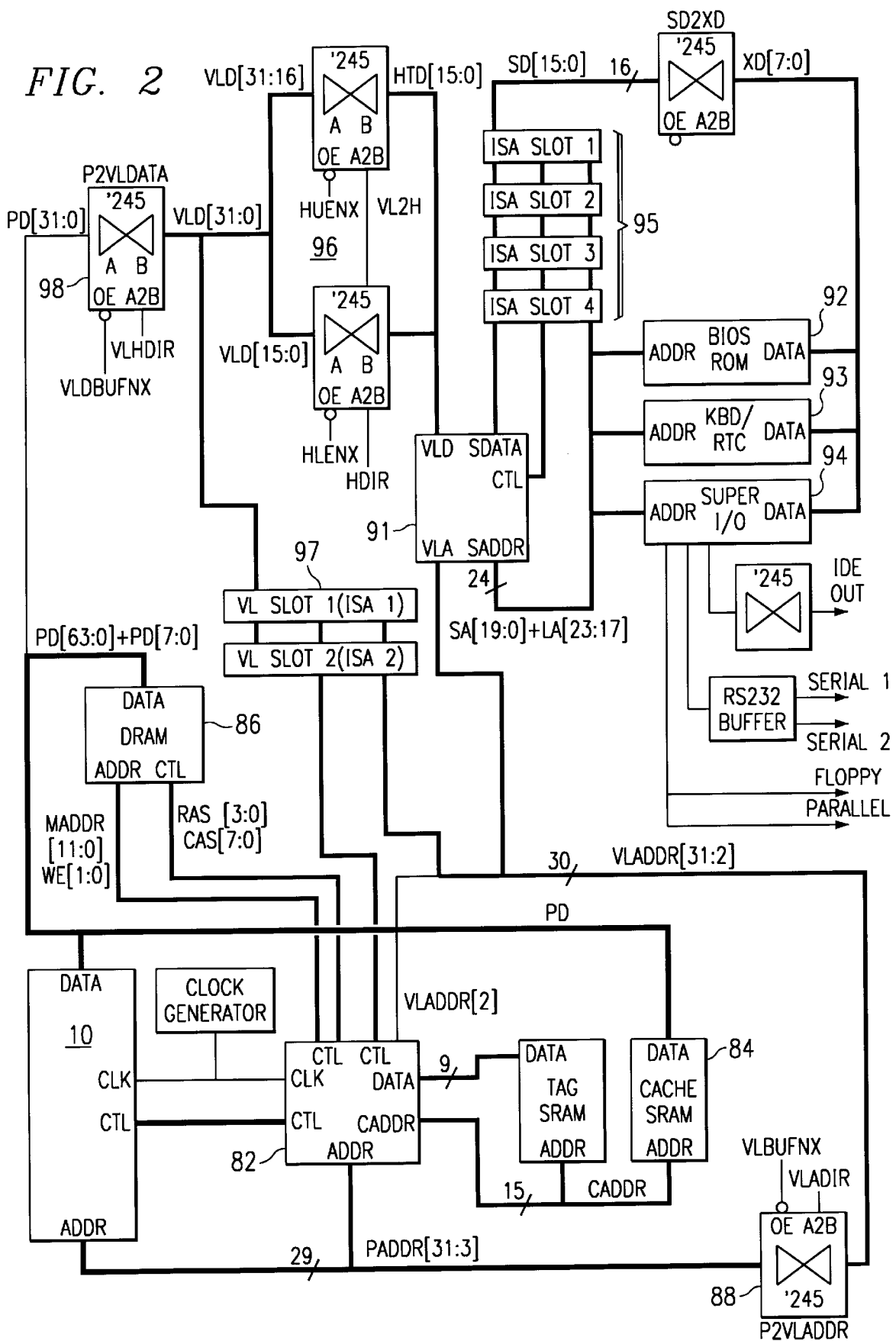
FIG. 2 illustrates an exemplary processor system design using the microprocessor.

The exemplary processor system is shown in FIGS. 1a and 1b, and FIG. 2. FIGS. 1a and 1b respectively illustrate the basic functional blocks of the exemplary superscalar, superpipelined microprocessor along with the pipe stages of the two execution pipelines. FIG. 2 illustrates an exemplary processor system (motherboard) design using the microprocessor.

1.1. Microprocessor

Referring to FIG. 1a, the major sub-blocks of a microprocessor 10 include: (a) CPU core 20, (b) prefetch buffer 30, (c) prefetcher 35, (d) BPU (branch processing unit) 40, (e) ATU (Address Translation Unit) 50, and (f) unified 16 Kbyte code/data cache 60, including TAG RAM 62. A 256 byte instruction line cache 65 provides a primary instruction cache to reduce instruction fetches to the unified cache, which operates as a secondary instruction cache. An onboard floating point unit (FPU) 70 executes floating point instructions issued to it by the CPU core 20.

The microprocessor uses internal 32-bit address and 64-bit data buses ADS and DATA. A 256 bit (32 byte) instruction bus IBus, corresponding to the 32 byte line size of the unified cache 60 and the instruction line cache 65, allows a full line of 32 instruction bytes to be transferred to the instruction line cache in a single clock. A 128 bit (16 byte) prefetch bus PFBus, corresponding to the 16 byte prefetch request size is used to transfer 16 instruction bytes into the prefetch buffer 30 from either the instruction line cache 65 or the unified cache 60. Interface to external 32 bit address and 64 bit data buses is through a bus interface unit BIU.

The CPU core 20 is a superscalar design with two execution pipes X and Y. It includes an instruction decoder 21, address calculation units 22X and 22Y, execution units 23X and 23Y, and a register file 24 with 32 32-bit registers. An AC control unit 25 includes a register translation unit 25a with a register scoreboard and register renaming hardware. A microcontrol unit 26, including a microsequencer and microrom, provides execution control.

Writes from CPU core 20 are queued into twelve 32 bit write buffers 29—write buffer allocation is performed by the AC control unit 25. These write buffers provide an interface for writes to the unified cache—noncacheable writes go directly from the write buffers to external memory. The write buffer logic supports optional read sourcing and write gathering.

A pipe control unit 28 controls instruction flow through the execution pipes, including keeping the instructions in order until it is determined that an instruction will not cause an exception, squashing bubbles in the instruction stream, and flushing the execution pipes behind branches that are mispredicted and instructions that cause exceptions. For each stage, the pipe control unit keeps track of which execution pipe contains the earliest instruction, and provides a stall output and receives a delay input.

BPU 40 predicts the direction of branches (taken or not taken), and provides target addresses for predicted taken branches and unconditional change of flow instructions (jumps, calls, returns). In addition, it monitors speculative execution in the case of branches and floating point instructions, i.e., the execution of instructions speculatively issued after branches which may be resolved as mispredicted, and floating point instructions issued to the FPU which may fault after the speculatively issued instructions have completed execution. If a floating point instruction faults, or if a branch is mispredicted (which will not be known until the EX or WB stage for the branch), then the execution pipeline must be repaired to the point of the faulting or mispredicted instruction (i.e., the execution pipeline is flushed behind that instruction), and instruction fetch restarted.

Pipeline repair is accomplished by creating checkpoints of the processor state at each pipe stage as a floating point or predicted branch instruction enters that stage. For these checkpointed instructions, all resources (programmer visible registers, instruction pointer, condition code register) that can be modified by succeeding speculatively issued instructions are checkpointed. If a checkpointed floating point instruction faults or a checkpointed branch is mispredicted, the execution pipeline is flushed behind the checkpointed instruction—for floating point instructions, this will typically mean flushing the entire execution pipeline, while for a mispredicted branch there may be a paired instruction in EX and two instructions in WB that would be allowed to complete.

For the exemplary microprocessor 10, the principle constraints on the degree of speculation are: (a) speculative execution is allowed for only up to four floating point or branch instructions at a time (i.e., the speculation level is maximum 4), and (b) a write or floating point store will not complete to the cache or external memory until the associated branch or floating point instruction has been resolved (i.e., the prediction is correct, or the floating point instruction does not fault).

The unified cache 60 is 4-way set associative (with a 4k set size), using a pseudo-LRU replacement algorithm, with write-through and write-back modes. It is dual ported (through banking) to permit two memory accesses (data read, instruction fetch, or data write) per clock. The instruction line cache is a fully associative, lookaside implementation (relative to the unified cache), using an LRU replacement algorithm.

The FPU 70 includes a load/store stage with 4-deep load and store queues, a conversion stage (32-bit to 80-bit extended format), and an execution stage. Loads are controlled by the CPU core 20, and cacheable stores are directed through the write buffers 29 (i.e., a write buffer is allocated for each floating point store operation).

Referring to FIG. 1b, the microprocessor has seven-stage X and Y execution pipelines: instruction fetch IF, two instruction decode stages ID1 and ID2, two address calculation stages AC1 and AC2, execution EX, and write-back WB. Note that the complex instruction decode ID and address calculation AC pipe stages are superpipelined.

The IF stage provides a continuous code stream into the CPU core 20. The prefetcher 35 fetches 16 bytes of instruction data into the prefetch buffer 30 from either the (primary) instruction line cache 65 or the (secondary) unified cache 60. BPU 40 is accessed with the prefetch address, and supplies target addresses to the prefetcher for predicted changes of flow, allowing the prefetcher to shift to a new code stream in one clock.

The decode stages ID1 and ID2 decode the variable length X86 instruction set. The instruction decoder 21 retrieves 16 bytes of instruction data from the prefetch buffer 30 each clock. In ID1, the length of two instructions is decoded (one each for the X and Y execution pipes) to obtain the X and Y instruction pointers—a corresponding X and Y bytes-used signal is sent back to the prefetch buffer (which then increments for the next 16 byte transfer). Also in ID1, certain instruction types are identified, such as changes of flow, and immediate and/or displacement operands are separated. The ID2 stage completes decoding the X and Y instructions, generating entry points for the microrom and decoding addressing modes and register fields.

During the ID stages, the optimum pipe for executing an instruction is determined, and the instruction is issued into that pipe. Pipe switching allows instructions to be switched from ID2X to AC1Y, and from ID2Y to AC1X. For the exemplary embodiment, certain instructions are issued only into the X pipeline: change of flow instructions, floating point instructions, and exclusive instructions. Exclusive instructions include: any instruction that may fault in the EX pipe stage and certain types of instructions such as protected mode segment loads, string instructions, special register access (control, debug, test), Multiply/Divide, Input/Output, PUSHA/POPA (PUSH all/POP all), and task switch. Exclusive instructions are able to use the resources of both pipes because they are issued alone from the ID stage (i.e., they are not paired with any other instruction). Except for these issue constraints, any instructions can be paired and issued into either the X or Y pipe.

The address calculation stages AC1 and AC2 calculate addresses for memory references and supply memory operands. The AC1 stage calculates two 32 bit linear (three operand) addresses per clock (four operand addresses, which are relatively infrequent, take two clocks). Data dependencies are also checked and resolved using the register translation unit 25a (including register renaming hardware)—the 32 physical registers 24 are used to map the 8 general purpose programmer visible logical registers defined in the X86 architecture (EAX, EBX, ECX, EDX, EDI, ESI, EBP, ESP).

The AC unit includes 8 architectural logical) registers (representing the X86 defined register set) that are used by the AC unit to avoid the delay required to access in AC1 the register translation unit before accessing register operands for address calculation. For instructions that require address calculations, AC1 waits until the required data in the architectural registers is valid (no read after write dependencies) before accessing those registers. During the AC2 stage, source operands are obtained by accessing the register file 26 and the unified cache 60 with the physical address (for cache hits, cache access time for the dual ported unified cache is the same as that of a register, effectively extending the register set)—the physical address is either the linear address, or if address translation is enabled, a translated address generated by the ATU 50.

Translated addresses are generated by the ATU 50 (using a TLB or translation lookaside buffer) from the linear address using information from page tables in memory and workspace control registers on chip. The unified cache is virtually indexed and physically tagged to permit, when address translation is enabled, set selection with the untranslated address (available at the end of AC1) and, for each set, tag comparison with the translated address from the ATU (available early in AC2). Checks for any segmentation and/or address translation violations are also performed in AC2.

Instructions are kept in program order until it is determined that they will not cause an exception. For most instructions, this determination is made during or before AC2—floating point instructions and certain exclusive instructions may cause exceptions during execution. Instructions are passed in order from AC2 to EX (or in the case of floating point instructions, to the FPU)—because integer instructions that may still cause an exception in EX are designated exclusive, and therefore are issued alone into both execution pipes, handling exceptions in order (i.e., maintaining precise exceptions) is ensured.

The execution stages EXX and EXY perform the operations defined by the instruction. Instructions spend a variable number of clocks in EX, i.e., they are allowed to execute out of order (out of order completion). Both EX stages include adder, logical, and shifter functional units, and in addition, the EXX stage contains multiply/divide hardware.

The write back stage WB updates the register file 24, condition codes, and other parts of the machine state with the results of the previously executed instruction. The register file is written in PH1 (phase 1) of WB, and read in PH2 (phase 2) of AC2.

Figure 1C:
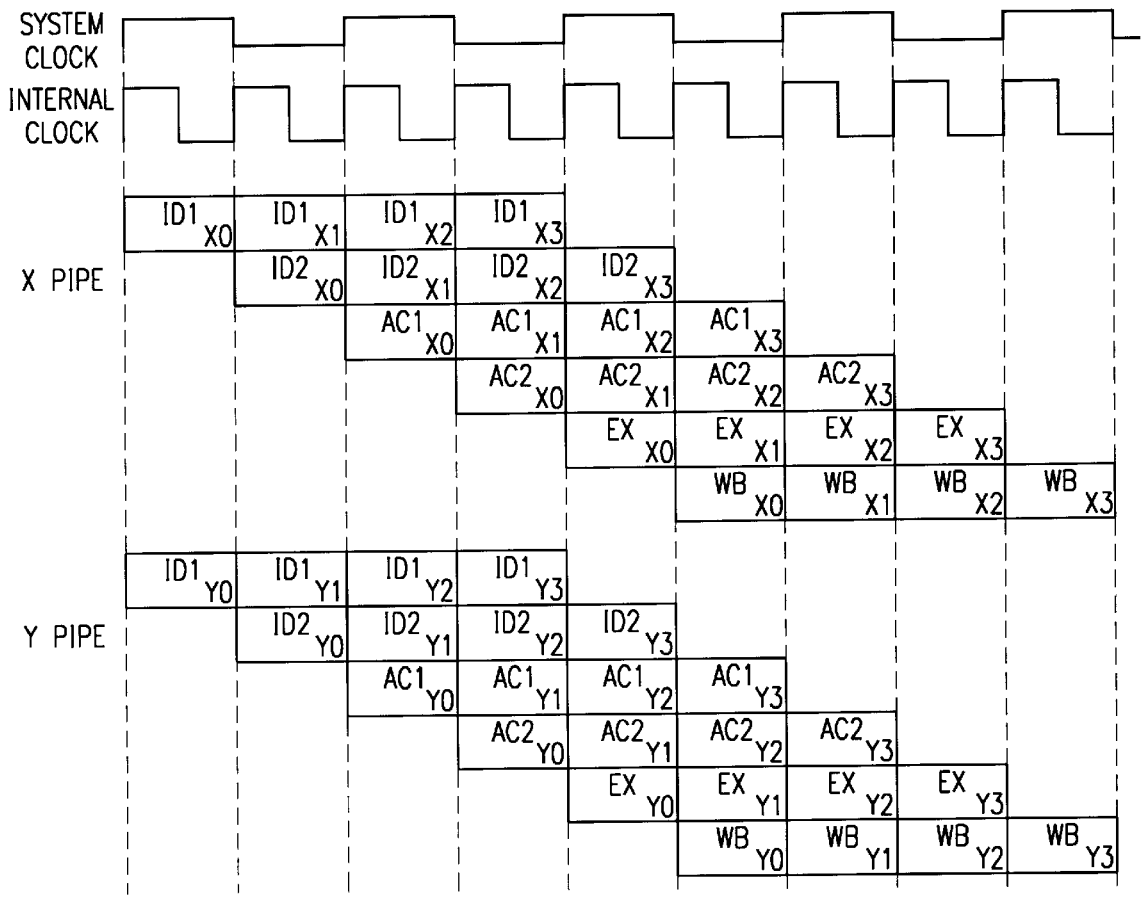
FIG. 1c illustrates an idealized flow of instructions through the X and Y execution pipes.

FIG. 1c illustrates a flow of eight instructions through the X and Y pipelines, idealized to illustrate the major advantage of pipelining—increasing the number of instructions completed per clock without reducing the execution time of an individual instruction. As shown, no stage requires more than one internal clock cycle (2×the external clock)—in actual operation, one or more stages may require additional clock cycles to complete, thereby changing the flow of instructions through the other pipe stages. Moreover, the flow of instructions through one pipeline may be dependent upon the flow of instructions through the other pipeline.

1.2. Processor System

Referring to FIG. 2, for the exemplary embodiment, microprocessor 10 is used in a processor system that includes a single chip memory and bus controller 82. The memory/bus controller 82 provides the interface between the microprocessor and the external memory subsystem—level two cache 84 and main memory 86—controlling data movement over the 64 bit processor data bus PD (the data path is external to the controller which reduces its pin count and cost).

Controller 82 interfaces directly to the 32-bit address bus PADDR, and includes a one bit wide data port (not shown) for reading and writing registers within the controller. A bidirectional isolation buffer 88 provides an address interface between microprocessor 10 and VL and ISA buses.

Controller 82 provides control for the VL and ISA bus interface. A VL/ISA interface chip 91 (such as an HT321) provides standard interfaces to a 32 bit VL bus and a 16 bit ISA bus. The ISA bus interfaces to BIOS 92, keyboard controller 93, and I/O chip 94, as well as standard ISA slots 95. The interface chip 91 interfaces to the 32 bit VL bus through a bidirectional 32/16 multiplexer 96 formed by dual high/low word [31:16]/[15:0] isolation buffers. The VL bus interfaces to standard VL slots 97, and through a bidirectional isolation buffer 98 to the low double word [31:0] of the 64 bit processor data bus PD.

2. Branch Processing

Referring to FIG. 1a, Branch Processing Unit 40 provides target prefetch addresses for predicted taken branches (including loops) and unconditional change of flow (UCOF) instructions (jumps, calls, returns)—for branches, the BPU monitors the execution of the branch to resolve branch predictions, and repair mispredictions. Recall that, for the X86 ISA, an instruction may be 1 to 15 bytes (average instruction length about 2.5 bytes), and that generally one of every four to six instructions is a COF.

Figure 3A:
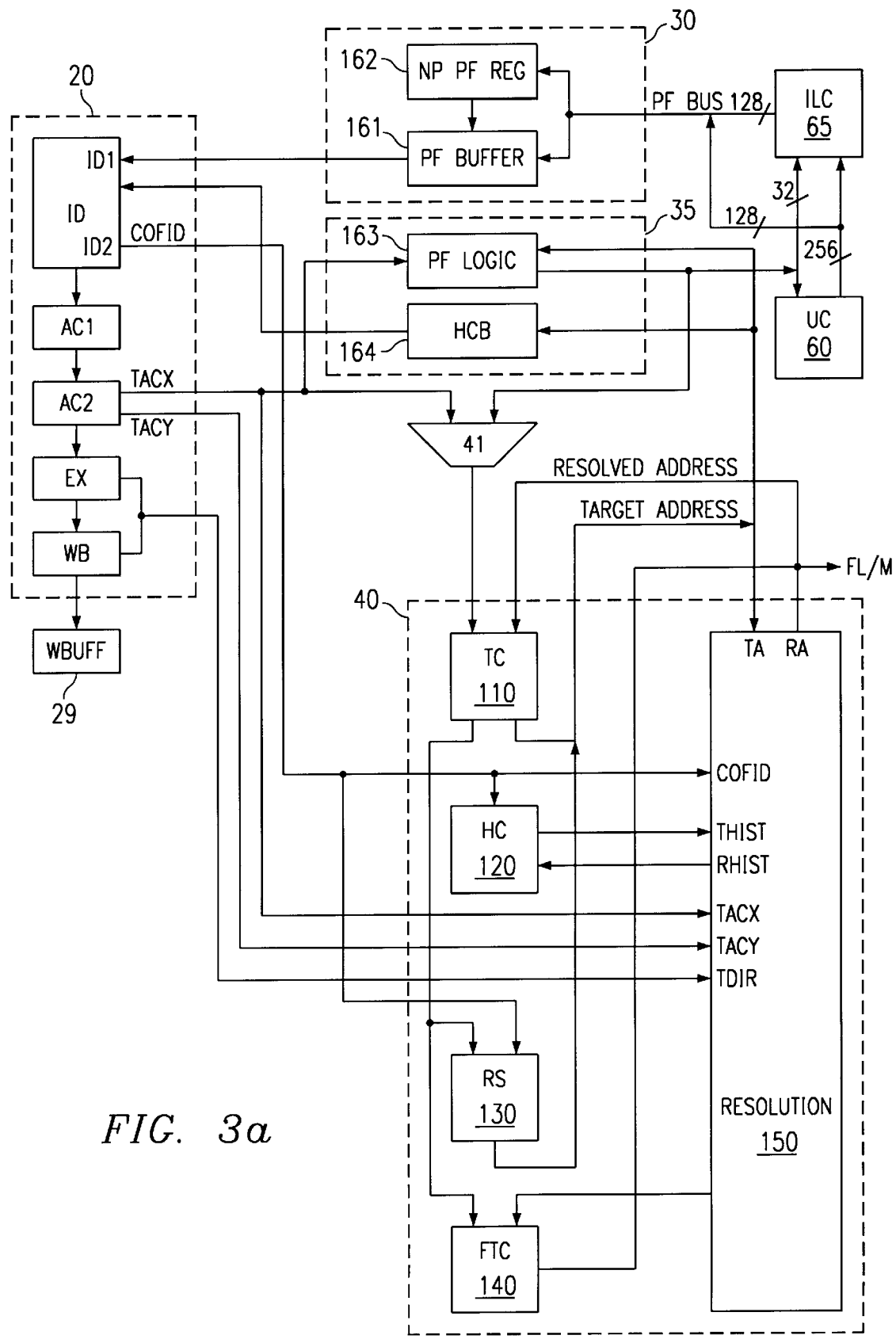
FIG. 3a illustrates the prefetch buffer, prefetcher, and branch processing unit.

FIG. 3a illustrates the functional blocks of the BPU 40, as well as the Prefetch Buffer 30 and the Prefetcher 35.

The BPU includes a target cache 110 for storing target addresses for UCOFs and predicted taken branches—a history cache 120 stores history information for branches predicted not taken. A return address stack 130 stores target addresses for returns associated with calls stored in the target cache, while a far target cache 140 stores limits and mode bits for far targets stored in the target cache. Resolution logic 150 monitors branch execution, resolving branch predictions (in EX or WB) and repairing the execution pipeline in the case of mispredictions.

The Prefetch Buffer 30 includes a 64 byte prefetch buffer 161 and three 16 byte NP prefetch registers 162 that are used in prefetching in the not-predicted path of a branch. The Prefetcher 35 includes prefetch logic 163 used in generating and issuing prefetch requests, and a hit confirmation buffer 164 used in confirming that a COF predicted by the BPU is actually decoded.

Figure 3B:
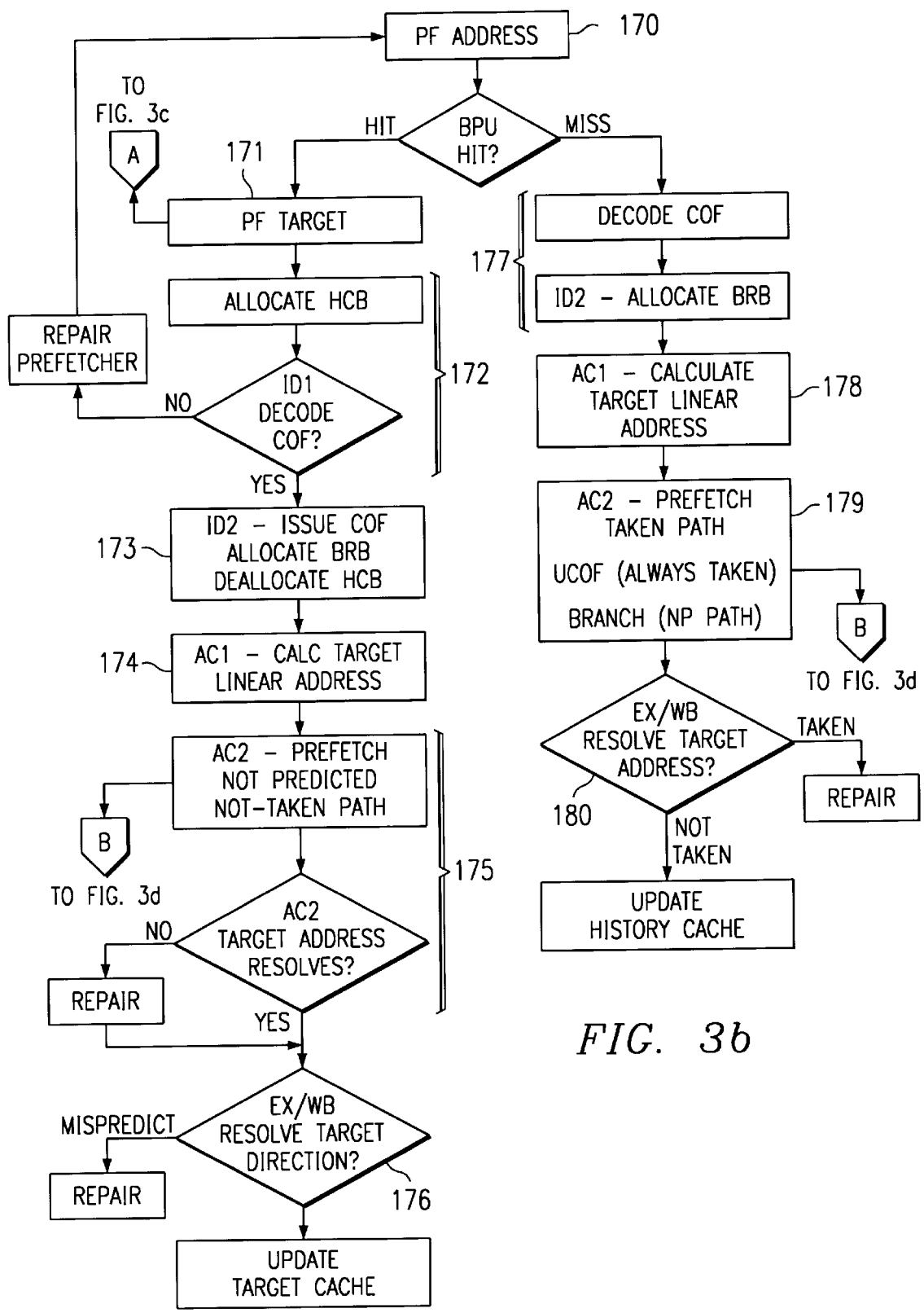
FIGS. 3b–3d are flow charts illustrating prefetch operations, including (FIG. 3b) general COF operations including BPU access, COF decode, COF confirmation, and COF resolution, (FIG. 3c) issuing parallel prefetch requests to both the instruction line cache and the unified cache including dynamic prioritization of accesses to the unified cache, and (FIG. 3d) prefetching the not-predicted taken path of a branch, including aborting an access to the unified cache if the access stalls or misses.

FIG. 3b illustrates general COF operations implemented by the Prefetch Unit, Decoder, and the BPU. Referring also to FIG. 3a, the BPU is accessed (170) at prefetch time with the prefetch address. For accesses that hit in the BPU, the target address is supplied to prefetcher 35, which begins prefetching (171) at the predicted target address, shifting the code stream in one clock as it enters the prefetch buffer 30.

COF confirmation (172) involves confirming that a COF predicted by the BPU is actually decoded, which it may not be in the case of a previously undetected COF that is in the same prefetch block as another COF stored in the BPU, or in the case of self-modifying code. When a prefetch address hits in the BPU, COF information is allocated into the hit confirmation buffer—if the COF does not decode, this information is used to repair the prefetcher.

If the COF does decode, i.e., the COF is confirmed, it will be issued (173) into the X-pipe by ID2 (ID2X or ID2Y). At the same time, the hit confirmation buffer is deallocated and the COF is allocated into a branch resolution buffer in resolution logic 150—information in the branch resolution buffer will be used in resolving a conditional COF, repairing a branch misprediction, and updating the BPU after branch resolution.

The COF issues from ID2 into AC1 (174), which calculates the actual target linear address for both predicted taken branches and UCOFs. During AC2 (175), the calculated target address is compared with the predicted target address supplied by the BPU—if a target mismatch occurs, repair is accomplished by flushing the pipe behind the COF and prefetching the actual target address. Also in AC2, the prefetcher 35 issues a prefetch request for the not-predicted not-taken path.

A branch will resolve as to target direction in EX or WB (176). If it resolves as correctly predicted, the corresponding entry in the target cache 110 may be updated with new history information (depending on the history state of the branch and the prediction algorithm). If the branch resolves as mispredicted, then the branch resolution logic 150 will repair the misprediction using information in the branch resolution buffer allocated for that branch, and correspondingly update the target cache and/or history cache.

For accesses that miss in the BPU, if a COF is decoded (177) at ID1, then in ID2 the COF is allocated into a branch resolution buffer in the branch resolution logic 150.

The COF will issue from ID2 to AC1, and the target address will be calculated (178). For UCOFs, the target address is supplied to the BPU and the prefetcher in AC2, for fetching the target. For branches, a not-taken prediction is assigned (i.e., prefetch continues in the fall through direction)—the target address is supplied to the BPU and the prefetcher in AC2 for fetching in the not-predicted taken direction. Regarding branches, the exemplary embodiment treats all branches including LOOP instructions the same in assigning a default not-take prediction—the design choice could be made to assume that LOOPs in particular will be taken.

A branch will resolve as to target direction in EX or WB (180). If it resolves as correctly predicted as not-taken, an entry may be allocated in the history cache 120, or an existing entry may be updated with new history information. If the branch resolves as mispredicted, then the branch resolution logic 150 will repair the misprediction using information in the branch resolution buffer allocated for that branch, and correspondingly update the history cache and/or target cache.

Note that branches will issue only if the speculation level due to outstanding (unresolved) branches (or floats) is three or less—otherwise the branch will stall at ID2 and await resolution of an outstanding speculation instruction (i.e., a reduction in the speculation level). From above, UCOFs are resolved by confirming the actual target address at AC2, while branches are resolved by confirming the actual target address at AC2 and the target direction at EX or WB.

2.1. Terminology

The following terminology will be used. COF instructions are either (a) "branches" which are conditional, or (b) "unconditional COFs or UCOFs" which are jumps, calls, returns.

"Detected COFs" are COFs for which the BPU either (a) for UCOFs and predicted-taken branches, supplies a target address, or (b) for branches that are predicted not taken, stores history information used by the BPU in deciding whether to change the not-taken prediction. For "undetected COFs", the BPU does not have either a target address or history information—a COF may be undetected because it is encountered for the first time or because any entries in the BPU for the COF have been replaced by more recently executed COFs.

A branch is either (a) "predicted taken" and a target address supplied to change the direction of the code stream, or (b) "predicted not-taken" such that the code stream is allowed to continue in the not-taken (fall through) direction. Thus, detected branches have (a) a "predicted direction", and (b) a "not-predicted direction" (opposite the predicted direction). A predicted not-taken branch may be either (a) a detected branch that is dynamically predicted riot-taken as represented by history information stored in the BPU, or (b) an undetected branch that is assigned (statically) a not-taken prediction.

The term "hit" used in conjunction with the BPU means that, in response to a prefetch access, the BPU detects a COF and supplies a target address to the prefetcher—predicted taken branches and UCOFs. The term "miss" used in conjunction with the BPU means either (a) that a COF is undetected, or (b) that a COF is a detected branch that is predicted by the BPU not-taken—that is, a BPU miss includes branches for which history information is available in the BPU but the prediction is not-taken.

Speculative execution means speculatively issuing integer instructions past branches (or UCOFs) or floating point instructions (floats), and speculatively executing those instructions such that the processor state (instruction pointer, stack pointer, registers, condition codes, flags) changes. The term "speculation instruction" refers to either a branch (or UCOF) or a float (floating point instruction), while the terms "speculatively issued" and "speculatively executed" instructions refer to integer instructions that issue after a speculation instruction. A "speculation error" is a branch misprediction (target address or direction) or floating point exception. Speculation instructions are retired if no speculation error results from their execution—otherwise, the execution pipeline must be repaired by recovering the processor state at the time the speculation instruction issued. The "speculation level" means the number of unresolved speculation instructions that are outstanding (i.e., issued from ID2 but not yet resolved in EX/WB) at a given time.

2.2. Prefetch Referring to FIGS. 1b and 3a, in the IF stage, prefetcher 35 prefetches instruction bytes into prefetch buffer 30, which includes prefetch buffers 161 and NP (not-predicted) prefetch registers 162 (used to support prefetch in the not-predicted direction for branches). That is, for the exemplary X86 processor, the prefetcher prefetches instruction bytes—instruction boundaries are not defined until instruction decode in the ID stage.

Prefetcher 35 prefetches from either primary instruction line cache 65 or unified cache 60, providing a code stream to CPU core 20. The instruction line cache 65 is a fully associative primary instruction cache (lookaside to the secondary unified cache 60). It holds eight 32 byte lines, corresponding to the 32 byte (256 bit) cache line size in the unified cache—a line fill over the 256 bit PFB from the unified cache is performed in a single clock.

Prefetch requests issued by the Prefetcher 35 are based on linear (untranslated) addresses, both in the case of sequential prefetching and COFs. Both the unified cache 60 and the instruction line cache 65 store physical addresses—linear-to-physical translation is performed, for the unified cache 60 by the TLB (in the ATU 50 in FIG. 1a), and for the instruction line cache 65 by translation logic included as part of that cache.

2.2.1. Prefetch Request

Referring to FIG. 3a, for the exemplary prefetcher, prefetch requests are generally for 16 instruction bytes, corresponding to the 16 byte transfers from the prefetch buffer to the decoder. The instruction bytes are returned from either the instruction line cache 65 or the unified cache 60 over the 128 bit (16 byte) PFBuses (if both caches miss, an external fill cycle is run by the unified cache, which then routes the requested instruction bytes to the prefetcher over the PFBus).

The prefetcher issues separate prefetch requests for Low and High 8 byte (two dword or 64 bit) prefetch blocks—the prefetch address for the High Block is the prefetch request address (which returns the Low Block) incremented by +8. The next prefetch request is the current prefetch request address incremented by +16.

The exemplary PFBus includes separate valid signals for the Low and High Block of the prefetch request. The control logic in both the instruction line cache 65 and the unified cache 60 signals when the Low and High Blocks are valid. If the Low and High Blocks are in the same cache line, they will be returned to the prefetcher in the same clock—otherwise, the Low Block will be returned first and then the High Block (note that the Low and High Blocks may come from different caches, or that the High Block may require an external fill cycle).

The prefetch address is not required to be memory aligned—the cache logic for both the instruction line cache and the unified cache converts the prefetch address to an aligned access.

2.2.1.1. Access UC/Iline in Parallel

Figure 3C:
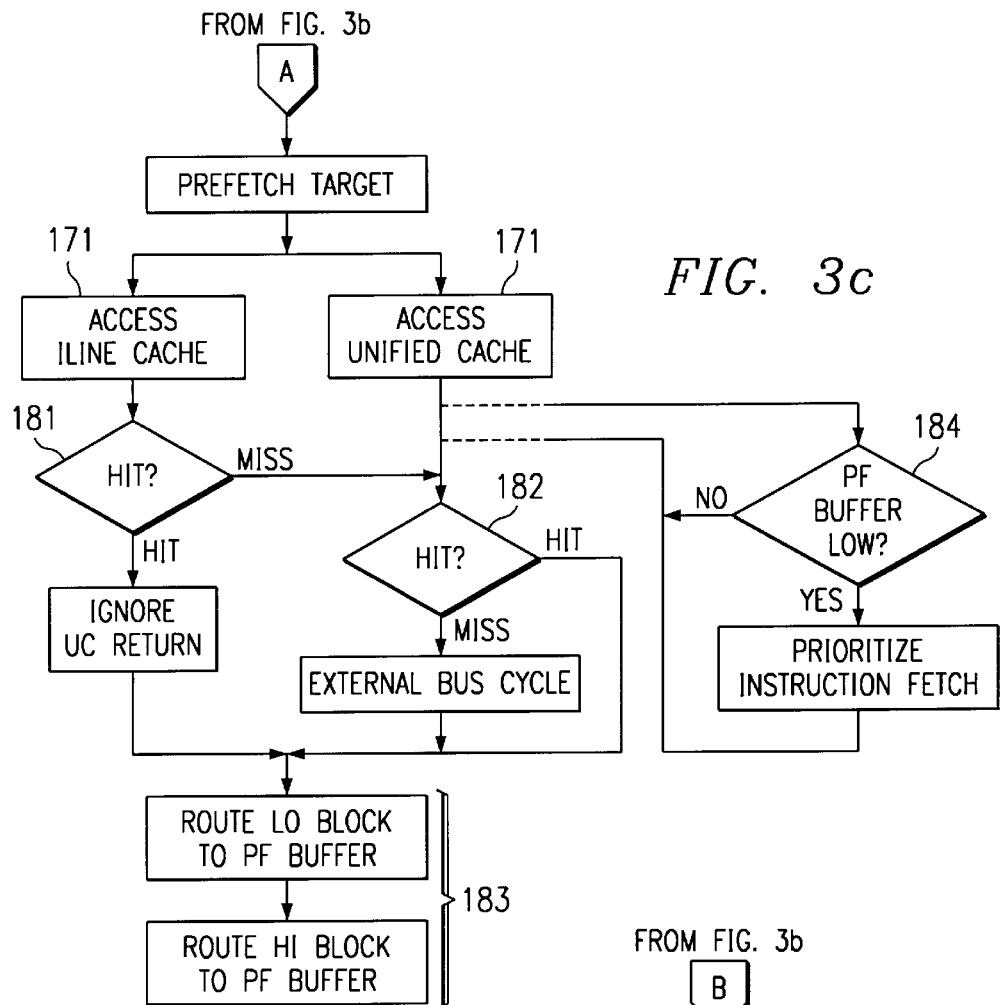

FIG. 3c illustrates a prefetch scheme in which a prefetch request address is issued in parallel (171) to both the instruction line cache 65 and the unified cache 60. If the prefetch request hits (181) in the instruction line cache, any data returned by the unified cache is ignored (according to the exemplary prioritization scheme, an instruction prefetch from the unified cache will stall for simultaneous data fetches)—if the request misses in the unified cache, a line fill will not be run.

If the prefetch request misses in the instruction line cache, but hits (182) in the unified cache, the unified cache supplies the corresponding 32 byte cache line to the instruction line cache. If the prefetch request also misses in the unified cache, an external fill cycle will be run.

In either case, the Low Block and then the High Block is routed (183) into the prefetch buffer—when the cache responding to the prefetch request has valid data, the low 8 bytes and then the high 8 bytes of the PFBus are signaled valid. Note that, in the case of a split line request, a respective cache will require access to two successive cache lines to return both Low and High Blocks. Note, also, that the Low/High prefetch addresses may hit different caches.

For situations in which only the Low Block prefetch address is generated, see, Section 2.2.4.

2.2.1.2. Dynamic UC Prioritization

Referring to FIG. 1a, the unified cache 61 is dual ported, allowing at most two accesses per clock. However, in any given clock, the unified cache may be accessed for operand reads, instruction fetches, inquiry reads, and writes (code or data).

The normal UC access prioritization scheme for granting access to the unified cache is:

operand reads
instruction fetches
inquiry (snoop) reads
writes (code or data)

Operand reads are given priority to avoid stalling the execution pipe. Instruction fetches are given lower priority, but the primary instruction line cache 65 is used to buffer instruction bytes to feed the prefetch buffer.

A dynamic access prioritization technique can be used to improve execution pipeline performance by adjusting UC cache access prioritization according to selected events affect or may affect the execution pipeline. For an exemplary dynamic prioritization technique, instruction fetches are granted highest priority when the prefetch buffer 30 is less than half full (i.e., when the upper four 8 byte prefetch blocks are invalid), so that:

instruction fetches—prefetch buffer low
operand reads
instruction fetches—normal
inquiry reads
writes (code/data)

In the case where the code queue in the prefetch buffer has been reduced to half or less, the exemplary processor attempts to ensure that each clock, at least two instructions are decoded in ID and ready to issue into the X/Y pipes from ID2—normally, the prefetcher relies on the instruction line cache to enable the prefetch buffer to stay far enough ahead of the decode that prioritizing accesses to the unified cache below operand reads does not affect the ability of the prefetcher to deliver a steady code stream to the decoder.

Referring to FIG. 3c, when the prefetcher accesses the unified cache (171), it also signals if the prefetch buffer has four or more invalid prefetch blocks. If so, the unified cache will grant the instruction fetch highest priority (184), i.e., ahead of even operand reads.

2.2.2. Prefetch Buffer

Referring to FIG. 3a, prefetch buffer 161 holds 64 instruction bytes logically organized into eight 8 byte blocks BLK0–BLK7. Each 16 byte prefetch is divided into 8 byte Low and High Prefetch Blocks, with the Low Block being the first 8 byte block returned in response to the prefetch.

Prefetching is logically separated into Low and High Blocks to support split-prefetching when the BPU provides the target prefetch address. According to split prefetching, a 16 byte prefetch request need not be aligned to a 16 byte boundary (i.e., bit [3] equal to zero)—instead, the 16 byte prefetch request may be aligned to an 8 byte boundary (i.e., bit [2] equal to zero but bit [3] either [0 or 1]. Split prefetching is particularly advantageous in prefetching target addresses where the target would be in the High (second) Block of a 16-byte-aligned prefetch request—the prefetch request can start with the 8-byte-aligned Block containing the target address.

FIG. 4a enlarges prefetch buffer 161. BLK1 contains a jump J0 to a target T0 in BLK2. BLK4 contains a jump J1 to a target T1 in BLK5—BLK4 also contains a Target Tn, followed by a jump J2. Thus COF boundaries appear between BLK1/BLK2, and BLK4/BLK5. Whether a block is the Low or High Block of a prefetch is indicated below the block.

In response to the prefetch of BLK1 containing jump J0, the BPU provides Target T0 which is fetched in Low Block BLK2 (a target will always appear in the Low Block of a prefetch), creating the COF boundary BLK1/BLK2. The fetch continues with High Block BLK3. The prefetcher then increments to continue with Low Block 4, which contains jump J1—the prefetcher ignores the associated High Block returned in that prefetch, and instead switches immediately to the target address supplied by the BPU, fetching Low Block BLK5.

2.2.3. COF Addressing

FIG. 4a, along with FIGS. 4b and 4c, illustrate addressing for COFs for which the BPU supplies target addresses. The BPU supplies target addresses for UCOFs (jumps) and predicted taken branches (equivalent to jumps).

Associated with each COF is a basic block address BBA and a COF address COFID, which are piped along with the COF instruction through the pipe stages. The BBA identifies the 8 byte block in which the COF appears, while COFID is the address of the COF within a block. The BBA is used as the tag for a target address stored in the BPU target cache. The COFID is used as the tag for accessing the branch history cache.

Referring to FIG. 4a, the BBA for a COF is the prefetch address for the 8 byte block containing the COF—either the memory aligned Low/High Block address, or a target address in the case of a COF in the same block as the target with a higher address (i.e., the COF address follows in sequence the target address). High Block addresses always have their low 3 bits equal to zero. The low 3 bits of a Low Block addresses can be non-zero if the Low Block address is also a target address. Thus, for BLK1 the BBA for J0 is BBA0 (aligned to the block address), and for BKL4 the BBA for J1 is BBA2 (aligned) and the BBA for J2 is BBA3, the prefetch target address for the target Tn (non-aligned).

For the jumps J0 in BLK1 and J1 in BLK4, the decoder will increment directly to the respective targets T0 in BLK2 and T1 in BLK5. Thus, the shaded portions of those blocks will be ignored by the decoder.

Referring to FIG. 4b, the COF address is the address of the byte following the last byte of the COF. Thus, for jump J3 in BLK0, the corresponding COFID is the address of the next byte in the same 8 byte block, for Jump J4 which spans blocks BLK0 and BLK1, the COFID is in BLK1, thereby ensuring that the whole jump instruction will be fetched, and for Jump J5 which is at the end of the block BLK1 the COFID is the first byte of the next block BLK2, even though no bytes of the jump appear in that block.

The low 6 bits of the COFID [5:0] are designated the COF location—the low three bits [2:0] are stored as data in the target cache, with the upper three bits [5:3] being available from the prefetch address. The COF location is used to confirm decode of a BPU hit for a predicted taken branch or UCOF—that is, when the BPU hits, the associated 6 bit COF location is provided to the Decoder, which then signals whether a COF is decoded at that designated address in the code stream. The COF location is also used as the lower 6 bits of the prefetch address pushed onto the return address stack, forming the return address when a call hits in the BPU (see, Section 2.3.3)

If a COF is not confirmed (i.e., not decoded), the BBA for the COF is ignored, and no allocation is made to the resolution logic. If a COF is decoded, then the BBA is input to the resolution logic and a COF entry made for use in target/direction resolution (see, Section 2.3.5).

The 6 bit COF location designates a specific location within a 64 byte code stream—the maximum distance between a COF being decoded and another COF in a sequential code stream is the length of the code queue, i.e. the size of the prefetch buffer. For the exemplary Prefetch Unit, the prefetch buffer is 64 bytes (eight 8 byte blocks).

Referring to FIG. 4c, a COF can have more than one BBA depending on the direction in the code stream from which the COF is reached. The COF6 in BLK0 is a branch with a target T6 in BLK1, which also contains a jump J7. If COF6 is predicted taken, the resulting BPU hit will cause the prefetcher to prefetch in the taken direction to the target T6 in BLK1, and then continue to jump J7—in this case, the BBA for J7 is BBA6 (the non-aligned T6 address). Alternatively, if COF6 is predicted not-taken, the prefetcher will continue in the not-taken (fall through) direction, reaching J7 by incrementing into BLK1—in this case, the BBA for J7 is BBA7 (aligned).

2.2.4. COF Prefetching

Referring to FIG. 3a, for BPU hits, the BPU supplies the COF target address to the prefetcher 35, allowing prefetching into prefetch buffers 161 to switch to the target address in one clock. In addition, for branches, the NP prefetch registers 162 are used for speculatively prefetching in the not predicted (NP) direction: (a) for BPU branch hits, prefetch in the not-taken direction (i.e., the fall through), and (b) for BPU branch misses, prefetch in the taken direction (including where the miss results from a previously undetected branch assigned a not-taken prediction).

Prefetcher 35 includes prefetch logic 163 and a hit confirmation buffer 164. In general, the prefetch logic (a) issues a sequential prefetch address by incrementing the current prefetch address by 16 for the next 16-byte prefetch block (Low and High Blocks), or (b) changes instruction flow and prefetches from a COF target address. The COF target address is supplied by: (a) the BPU, or (b) in the case of a BPU miss for an undetected UCOF, the target linear address from AC1 (the code flow does not change for branches that miss in the BPU which are predicted not-taken, either dynamically or by assignment). The hit confirmation buffer is used by the prefetch logic to confirm that predicted COFs (UCOFs and predicted taken branches) are actually decoded, and to repair the prefetcher if a predicted COF is not confirmed (not decoded).

Figure 4E:
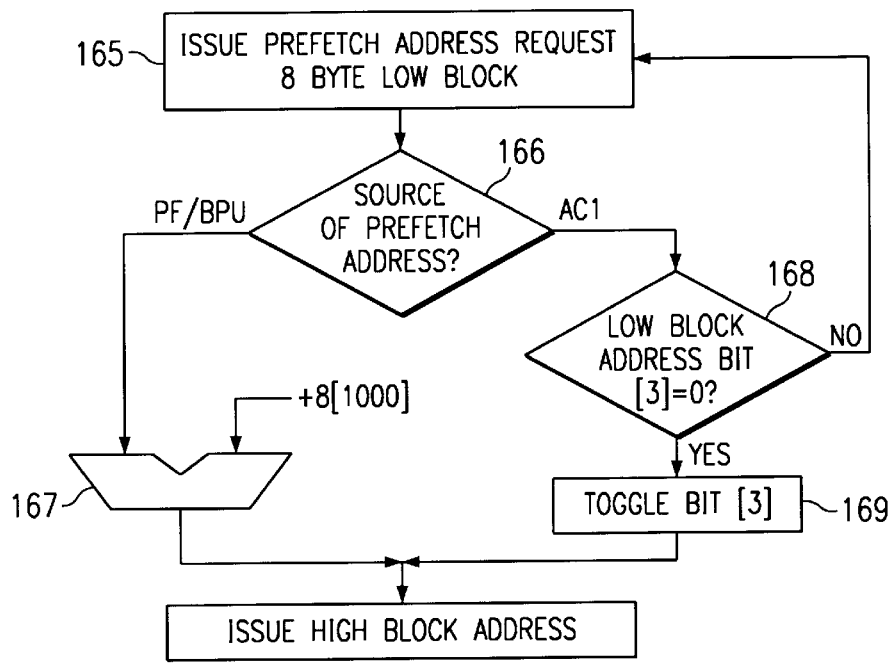
FIG. 4e illustrates prefetch address generation with split prefetching (i.e., generating 16 byte prefetch addresses aligned to 8 byte boundaries), including generating the High Block prefetch address from the Low Block prefetch address either (a) by incrementation if the prefetch request address is generated by the Prefetcher during normal sequential prefetching, or is supplied by the Branch Processing unit, or (b) by toggling bit [3] of a prefetch address supplied by AC1 if that bit is zero.

FIG. 4e illustrates an exemplary scheme for generating prefetch request addresses, with support for split prefetching. The High Block prefetch address is generated from the Low Block prefetch address by either incrementation or by toggling bit [3] of the Low Block address.

Prefetcher 35 issues 16 byte prefetch addresses based on: (a) for sequential prefetching, incrementing the prior prefetch request address by +16, (b) for COFs detected by the BPU (taken branches or UCOFs), issuing the target address supplied by the BPU, or (b) for COFs that are not detected by the BPU (UCOFs or the not-predicted taken path of a branch), issuing the target address supplied in AC1. The prefetch request address is the 8-byte-aligned Low Block address—according to the exemplary prefetch address generation scheme, whether the prefetcher generates the High Block address depends on whether the prefetch request address (the Low Block address) is obtained from (a) the prefetcher or the BPU, or from (b) AC1.

That is, prefetcher 35 issues (165) a 16 byte prefetch request (Low Block) which is 8-byte-aligned. If this prefetch request address is generated by incrementing the prior prefetch address or received from the BPU (166), then the High Block address is generated by adding (167) +8 ([1000]) to the prefetch request address (using incrementation to generate the High Block address avoids logic duplication).

If the prefetch target address is received from AC1, for the exemplary prefetcher design, not enough time is left in the clock cycle to both prefetch the Low Block and then perform the incrementation to prefetch the High Block. Instead, when a prefetch target address is supplied by AC1, an 8 byte, Low-Block-only prefetch occurs unless bit 3 of the prefetch request address is zero.

Specifically, if bit 3 of the Low Block address is [0], the only affect of adding +8 [1000] is to flip bit 3 from [0] to [1], and in particular no ripple into the higher order bits will result. Thus, the prefetch address generation logic recognizes (168) when bit 3 of the Low Block prefetch request address is [0], and toggles (169) that bit to obtain the High Block prefetch address without incrementation.

2.2.4.1. Predicted Path

When the BPU hits and provides a predicted target address, the prefetcher 35 immediately begins prefetching at the target address, switching the code stream into the prefetch buffer 30 in one clock.

| IF | Prefetch Request |
| | Access BPU |
| | BPU Hit |
| IF | Target fetch |
| | Allocate confirmation buffer |

COF confirmation is signaled when the COF decodes in ID1:

| ID1 | Confirm COF |
| | Deallocate confirmation buffer |
| | Allocate NP register (branches) |
| AC2 | Prefetch in the NP direction (branches) |

When the BPU misses but a COF is decoded in ID1, prefetch depends on whether the COF is conditional or unconditional. For a UCOF:

| ID1 | Decode UCOF |
| | Flush PF buffer |
| | Flush Confirmation Buffer |
| ID2 | Issue COF |
| AC1 | Target supplied to Prefetcher |
| AC2 | Prefetch target |

For a branch:

| ID1 | Decode Branch |
| ID2 | Issue Branch - Predict Not-Taken |
| | Allocate NP Register |
| AC2 | Prefetch NP (Taken) direction |

A branch will be resolved by the BPU in EX or WB. If the branch is mispredicted, the BPU will: (a) repair the execution pipeline by flushing the pipeline behind the mispredicted branch and recovering the processor state, and (b) repair the prefetcher by transferring the not-predicted address from the appropriate NP register to the prefetcher, restarting prefetch in the not-predicted direction.

2.2.4.2. Not Predicted Path

Referring to FIG. 3a, the exemplary NP prefetch registers include three 16 byte registers (for data) that permit one 16 byte prefetch request in the not-predicted direction of branch. That is, one register for each of three branches—up to three branches can be in the execution pipe after AC1 (when the NP prefetch register is allocated) before a branch resolves (AC2, EX, and WB). In addition, three registers hold target address, limits, and modes for accessing the BPU with the NP address.

The NP registers are allocated at AC1, after decode/ confirmation in ID. For BPU hits on predicted taken branches, after confirmation, prefetch starts in AC2 in the not-predicted fall through direction. For BPU misses on dynamically predicted not-taken branches or undetected branches assigned a not-taken prediction, prefetch in the not-predicted taken direction starts in AC2 after the branch target address has been calculated (AC1) and supplied to the prefetcher.

Prefetching in the not-predicted direction decreases the penalty for a mispredicted branch by one clock. That is, without prefetching in the not-predicted direction:

| Clk0 | Flush pipe in response to misprediction |
| Clk1 | Fetch not-predicted address (target of fall through) |
| Clk2 | ID1 - begin decode | and with prefetching in the not predicted direction:

| Clk0 | Flush pipe in response to misprediction |
| | Transfer NP register to prefetch buffer |
| Clk2 | ID1 - begin decode |

Figure 3D:
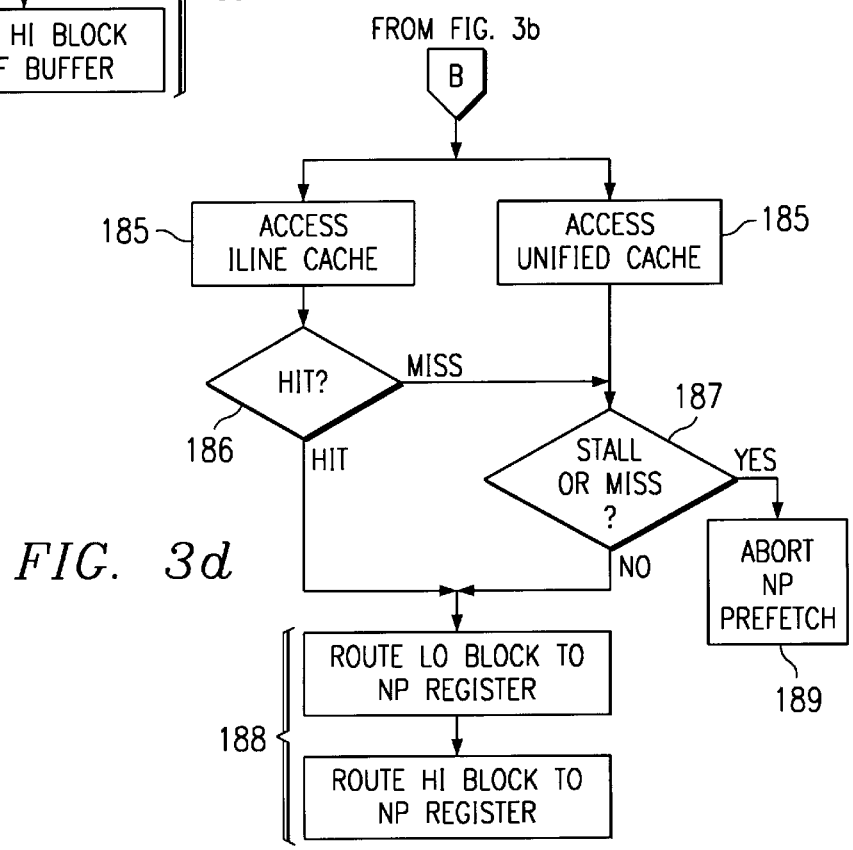

FIG. 3d illustrates an exemplary protocol for prefetching from the unified cache in the not-predicted direction. The protocol involves modifying the normal cache protocol of request, acknowledge, data valid, and abort to take into account the fact that, for the exemplary processor, data accesses issued by the execution pipelines to the unified cache take priority over instruction fetches.

As with normal prefetch requests, a prefetch request in the not-predicted direction are issued (185) in parallel to both the instruction cache and the unified cache. If the access misses (186) in the instruction line cache, but hits in the unified cache, the returned Low/High prefetch blocks will be routed (188) into the prefetch buffer.

However, if the access to the unified cache stalls (189), such as because of a higher priority data access, then the prefetch request will be aborted. This protocol recognizes that the prefetch for the not-predicted path issues in AC2 for a branch that will resolve in EX or WB—if the prefetch request to the unified cache stalls in AC2, performance will not be significantly impacted if prefetching the not predicted path awaits branch resolution (and unnecessary accesses to the unified cache in the case of branches that are not mispredicted are avoided).

2.2.4.3. Transfer to Decoder

Referring to FIG. 3a, prefetch buffer 161 is emptied by the instruction decoder in the ID stage—16 instruction bytes are retrieved from the prefetch buffer each clock. In ID1, the length of two instructions X and Y (one each for the X and Y execution pipes) is decoded, and a corresponding X and Y bytes-used signal is sent back to the prefetch buffer—the prefetch buffer increments by X+Y for the next 16 byte transfer to the decoder.

Except for COFs that hit in the BPU, the incrementation through the prefetch buffer is controlled by the X+Y bytes-used signal from the decoder. For a BPU hit, where the target address should be the next instruction decoded after a COF, the prefetcher knows the COF address COFID (i.e., the prefetch address for the 8 byte block containing the COF plus the 3 bit COF location from the Target Cache) and the target address, and therefore increments from the COF to the target address.

Referring to FIG. 4a, for Jump J0, the prefetcher will increment from J0 in block BLK1 to T0 in block BLK2. For the exemplary implementation, the decoder may decode a COF as either the X or Y instruction, although it will always issue from ID2 into the X-pipe—once the COF is decoded in ID1 (X or Y), it will advance to ID2 (X or Y) and then issue to AC1X, with a COF in ID2Y crossing over to AC1X (see, FIG. 1b). When the COF decodes in ID1 (X or Y), the Decoder increments to the target address in the next clock, which will be decoded as an X instruction.

2.2.5. COF Confirmation

Referring to FIG. 3a, for BPU hits, the hit confirmation buffer 164 is used to confirm that the corresponding COF (branch or UCOF) is actually decoded. Confirmation occurs at ID1, as the BPU hit is decoded. If a COF is not decoded, the confirmation buffer is used to repair the prefetcher.

At the IF stage, the prefetch logic 163 allocates the confirmation buffer 164, storing both (a) the COF location (and the associated limit and mode) based on the BBA and COFID for the COF, and (b) the not-taken prefetch address (and associated limit and mode). The exemplary hit confirmation buffer 164 includes three entries, with each entry including control and data fields.

The control fields in the hit confirmation buffer are:

| | |
|---|---|
| use far | far COF |
| hit low | Set if the hit is in the Low Block |
| set 1:0 | Set in Target Cache [0–3] |
| FT Index | 4 bit index for Far Target Cache |
| Limit High | COF is at the High Segment Limit |
| Limit Low | COF is at the Low Segment Limit |
| Branch | Valid bit |

The limit and mode is stored to permit prefetcher repair for far COFs that are not confirmed. The far target index bits are only used in the BPU implementation that includes a far target cache (see, Section 2.3.4)

| | |
|---|---|
| COF Loc | 3 bits of the 6 bit COF Location |
| Not-Taken | Not-Taken Prefetch Addr [31:0] |
| Target Addr | Target Addr [31:0] |
| Target Lim | Target Segment Limit [31:0] |
| Not-Taken Limit | Not-Taken Prefetch Segment Limit |
| Target Mode | Target Modes [8:0] |
| Not-Taken Mode | Not-Taken Prefetch Modes [8:0] |

A pointer in the hit confirmation buffer 164 points to the next COF to be confirmed. For each confirmation, the confirmation buffer sends to the decoder the COF location and the target address (i.e., the next address to be transferred to the decoder after the COF ). Note that a confirmation buffer entry is allocated for each BPU hit, and there can only be one BPU hit in a prefetch block.

To confirm a COF, the decoder in effect matches the predicted COF address with the address of the first byte following the decoded COF by comparing the predicted COF address to XCF and YCF according to:

XCF=IP+X-length

YCF=IP+X-length+Y-length where XCF confirms the X instruction, and YCF confirms the Y instruction.

This operation is difficult at higher clock rates because there may not be enough time to: (a) decode two instructions, (b) then add and compare the COFID's, and (c) then shift to the target instruction bytes (or to the next sequential instruction if the compare is false).

The exemplary microprocessor employs a faster method for confirming predicted branches. The initial steps are: (a) convert 5 bits of the 6 bit COF location (i.e., the low 5 bits of COFID) to a 32 bit one-hot field, (b) rotate the COF location by the low 5 bits of the current ID1 instruction pointer (based on the X and Y length values generated by the decoder). The logic equations for these convert and rotate steps are:

LCOF=five 2_32 (COF_location[4:0])

LCMID=(LCOF, LCOF)>>ID-IP[4:0]

where LCOF is the COF location, LCMID is LCOF minus ID-IP, and ID-IP is the current ID1 instruction pointer. The rotate-shift (>>) is performed by a barrel shifter concurrently with the length decode.

Confirmation involves: (a) selecting one of the LCMID bits when X-length becomes known (the first available form of X length is one-hot), and (b) selecting one of the LCMID bits when the Y length becomes known (the first available form of Y length is one-hot). Confirmation is signaled after the delay through the X and Y length one-hot selection logic, unless inhibited by confirmation qualification.

In an exemplary implementation, the 6th bit of the COF location [5] is used to qualify all confirmations signaled by the above 5-bit confirmation technique using one-hot and rotate logic. Basically, the 5-bit confirmation technique will accurately confirm any COFs that appear in 32 bytes of code (four 8 byte prefetch blocks), which is more than the 16 bytes of code that the exemplary Decoder can decode in a single clock.

However, the possibility exists that two COFs with the same COFID [4:0] will be separated by more than 32 bytes, such that the second COF will be in the upper 32 bytes (upper four 8 byte blocks) of the code queue. If the first COF is undetected while the second COF hits and is allocated into the hit confirmation buffer, then the decoder would erroneously confirm the first COF.

Such situations are infrequently encountered in normal code streams, but to detect them the COF location field extends to 6 bits (see, Section 2.2.3).

The straightforward approach to handling this special case would be to extend the one-hot and rotate technique to 6 bits. However, that would require expanding the logic, and in particular, the barrel shifter, from 32 to 64 bits to detect an infrequently occurring situation in which two COFs within the 64 byte code queue have the same lower 5 bits of COFID (i.e., are separated by more than 32 bytes).

The exemplary approach is to add a confirmation qualification step that qualifies all COF confirmations that would be signaled by the exemplary 5-bit one-hot and rotate COF confirmation technique. The exemplary confirmation qualification technique inhibits confirmation of a COF in the first 4 blocks (32 bytes) of the code queue if one of the second 4 blocks (32 bytes) has the same 8 byte block address [5:3] which selects 1 of 8 prefetch blocks in the prefetch buffer. Performance is not adversely impacted because these upper 32 instruction bytes cannot be used in the current clock's instruction decode.

The logic equation for the exemplary confirmation qualification technique is:

$$\text{if}((ID - IP[5^3] + 5) = = LCOF[5^3])\text{OR}$$
$$((ID - IP[5^3] + 6) = = LCOF[5^3])\text{OR}$$
$$((ID - IP[5^3] + 7) = = LCOF[5^3])\text{OR}$$
$$((ID - IP[5^3] + 8) = = LCOF[5^3]))\text{OR}$$

where ID-IP is the decoder instruction pointer for the instruction currently being decoded, and LCOF is the COF location (in our case, for a COF in the upper 32 bytes of the prefetch buffer).

Note that if the ID-IP bits [5:3] for the instruction currently being decoded, plus a 3 bit value of 5, 6, 7, or 8 (0h), is equal to the COF location LCOF bits [5:3], then COF confirmation is inhibited. In effect, this qualification technique determines whether a predicted COF is in the upper 32 bytes of the code queue.

For the exemplary embodiment, the one-hot selection logic for the X and Y lengths and the confirmation signals XCF and YCF is implemented conventionally using multiplexers. The one-hot X and Y length signals are used to select the corresponding LCMID one-hot field to provide one bit XCF and YCF confirmation signals (LCMID is a 12 bit field for XCF and a 16 bit field for YCF).

Use of this method reduces the delay in obtaining confirmation of a predicted COF.

Once a BPU hit is confirmed in ID1 (by the decoding of a COF), the corresponding COF entry in the hit confirmation buffer 104 is deallocated, and the COF is allocated into the BPU (resolution logic 150 in FIG. 3) in ID2. In general, information used for branch resolution is passed to the BPU through temporary registers (see, Section 2.3.5).

If a BPU hit is not confirmed, the prefetcher will restart prefetch at the address of the instruction after the purported COF instruction. It is not necessary to adjust the IP of the decoder because the decoder IP changes only on confirmation.

2.2.6 Prefetch Flow Control

Figure 4F:
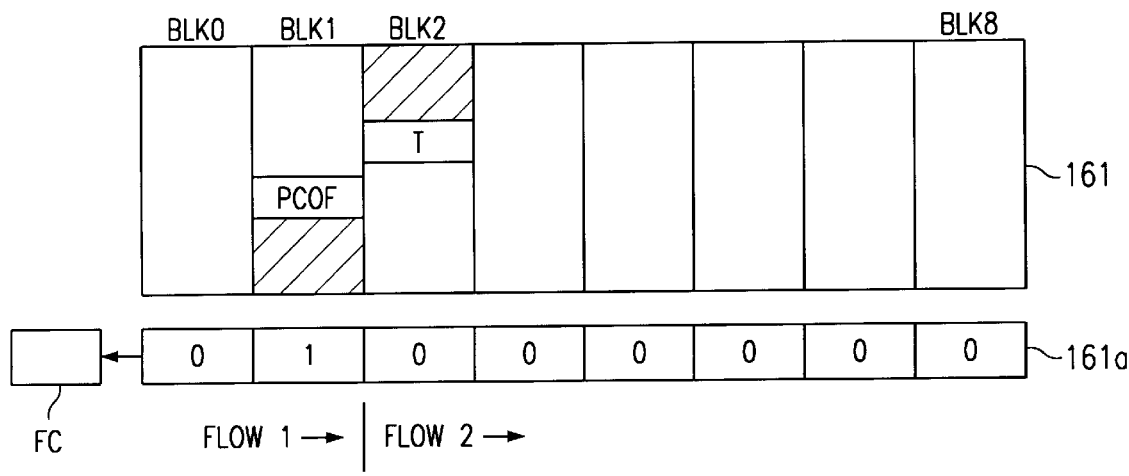
FIG. 4f illustrates a flow control scheme for controlling the transfer of instruction bytes from the Prefetch Buffer to the Decoder when COFs are encountered in the code stream, and in particular, when a COF is not confirmed.

FIG. 4f illustrates flow control logic associated with the Prefetch Buffer used in controlling the transfer of instruction bytes from the Prefetch Buffer to the Decoder when COFs are encountered in the code stream. In particular, the flow control scheme is used to prevent the Decoder from decoding instruction bytes in a prefetch block containing a target that should not have been prefetched.

Referring also to FIG. 3a, Prefetch Buffer 161 includes 8 byte prefetch blocks BLK0–BLK7. BLK1 contains an address PCOF for a predicted COF that hits in the BPU such the Prefetcher prefetches the corresponding target T into BLK2 of the Prefetch Buffer.

Thus, the predicted PCOF defines two separate code flows—code flow 1 includes the PCOF, and code flow 2 starts with the associated target. Code flow 1 includes prefetch blocks BLK0 and BLK1, while code flow 2 starts with BLK2.

The exemplary flow control scheme assigns a flow bit 161a to each prefetch block of the Prefetch Buffer 161. The flow control bit for a prefetch block is set [1] if the prefetch block contains a predicted COF, and is clear [0] if it does not—thus, for BlK0, the flow control bit is clear, for BLK1 the flow control bit is set corresponding to the predicted PCOF, and for BLK2 the flow control bit is clear, In addition, the flow control logic includes a flow control shift latch FC that latches the OR of the flow control bit(s) for the block(s) shifted out when all of the instruction bytes in the block(s) have been used by the Decoder. For example, in FIG. 4f, when the decoder increments beyond the last byte of BLK0, BLK0 shifts off and its flow bit [0] shifts into the flow control shift latch FC—BLK1 containing the predicted PCOF shifts to BLK0.

When BLK1 shifts to BLK0, the Decoder begins incrementing through the new BLK0, including the instruction bytes designated as the predicted PCOF. If the Decoder increments through that block before signaling confirmation for a COF at the PCOF address, then the BLK0 containing the PCOF address shifts out of the Prefetch Buffer, and the associated flow control bit [1] shifts into the flow control latch FC.

The flow control latch being set indicates that the new BLK0—BLK2 in FIG. 4e (shifted twice)—which includes the target for PCOF, begins a new code flow 2. Before incrementing into the new BLK0, the Decoder checks the code flow latch—if it is set, as is the case with the new BLK0, the Decoder will not increment into the new code flow until it has decoded the instruction at the PCOF address to confirm a COF decode.

If the Decoder does not decode a COF at the PCOF address, it signals no-confirmation to the Prefetcher. At the same time, the Decoder signals that there are no valid bytes in the Prefetch Buffer 161 (i.e., the Decoder is stalled).

If the Decoder does decode a COF at the PCOF address, it will clear the flow control latch FC, and commence incrementing through the new BLK0 at the target address T. That is, by clearing the flow control bit FC, the Decoder is able to continue decoding in the new code flow 2.

One advantage of this flow control scheme is that it avoids the complexity required to maintain information required to repair the Prefetcher and Decoder if the Decoder is allowed to continue decoding in the new code flow with the target address before COF confirmation.

2.2.7. ICOF Instruction

Referring to FIG. 3, the exemplary processor uses a special ICOF instruction to invoke a "COF" exception handler. Recall that exceptions are signaled prior to an instruction entering EX, except for exclusive instructions which may cause an exception in EX or WB.

When an exception is detected, the execution pipe 20 behind the instruction causing the exception must be flushed, and an exception handler invoked by injecting an entry point into the microrom to begin execution in EX. In addition, both AC and EX have any number of control points that must be reconditioned to prepare for the COF.

To reduce complexity of the pipe controller (28 in FIG. 1a), the exemplary exception handling scheme is to define the special ICOF instruction for invoking exception processing. When an exception is signaled by AC, EX or WB, the pipe controller: (a) flushes the execution pipe behind the instruction causing an exception, and (b) signals the decoder to inject into the execution pipeline (the X pipe) an ICOF instruction. The ICOF instruction then proceeds down the execution pipeline in the normal manner, reaching EX in two clocks (AC1 and AC2)—normal pipe control operations are performed, including adjusting control points as the ICOF advances.

When the ICOF reaches EX, it provides the microrom entry point for invoking the exception handler. Note that exception processing begins two clocks after the exception is signaled—this two clock delay represents a design tradeoff that allows simplification of the pipe controller.

If exception processing is invoked with an ICOF instruction, outstanding branches are flushed from the resolution logic and the execution pipes, and then an exception or interrupt handler can be invoked.

2.3. Branch Processing Unit

Referring to FIG. 3a, Branch Processing Unit 40 includes target cache 110, branch history cache 120, return address stack 130, and far target cache 140, together with resolution logic 150. The BPU is accessed through a multiplexer 41 with either (a) a prefetch address from prefetcher 35, (b) for BPU hits, the target address from the target cache, or (c) for undetected COFs, a target linear address from AC1. Recall that COFs are issued into the X-pipe of the CPU Core 20—references to the various stages of the execution pipeline will be to the X-pipe unless; the Y-pipe is specifically identified (for example, far COFs are designated exclusive instructions that use the Y-pipe to calculate the new limit).

Access with prefetch address is particularly advantageous for superscalar designs. It allows BPU operation to be decoupled from instruction issue, particularly as the number of execution pipes is increased beyond two.

Figure 5A:
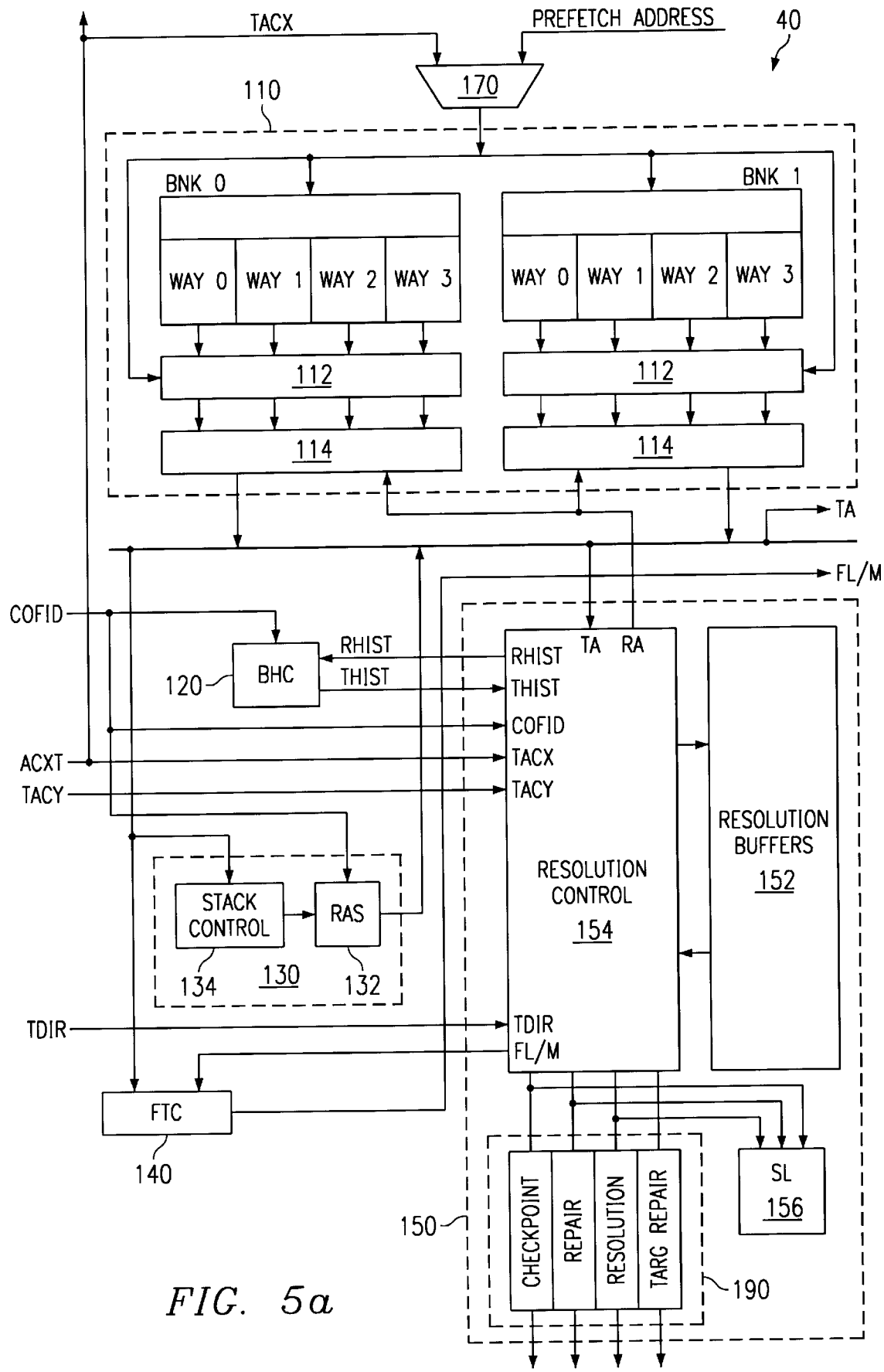
FIG. 5a illustrates the branch processing unit including the target, history, and far target caches, return stack, and resolution logic.

Referring to FIG. 5a, the branch processing unit is shown in more detail.

BPU 40 receives the following signals from the various stages of the CPU core and the prefetcher (not shown):

| | |
|---|---|
| PF | Prefetch address |
| COFID | Linear address of the first byte of the instruction after the COF decoded in ID1 |
| TACX | Target linear address from AC1 in the X-pipe |
| TACY | Target linear address from AC1 in the Y-pipe |
| TDIR | Direction of a branch in EX or WB |
| ICOF | COF instruction injected into the code stream by ID for exceptions and interrupts |

In addition, for far COFs (jumps, calls) the CPU core (AC1) provides a TMODES (Target Modes) signal to enable mode resolution.

COFID is the COF address decoded in ID1, which is used for (a) allocating an entry in the resolution buffers 152, with the low 5 bits of COFID providing the COF location, and (b) accessing the history cache during ID2.

Entries are allocated into the target cache, and assigned a strong taken prediction, for:
  undetected UCOFs, with TACX providing the target address TA,
  detected but predicted not-taken branches that resolve taken, if the prediction algorithm indicates a change to predicted taken, with the resolution logic providing resolved target addresses RTA, and
  undetected branches (assigned weak not taken) that resolve taken, with the resolution logic providing the resolved target addresses RTA.

Entries are allocated into the history cache, and assigned a strong not-taken prediction, for:
  predicted taken branches changed to predict not-taken, and
  undetected branches that are resolved not-taken.

TACX is used to provide a target address of a previously undetected UCOF supplied by ACX to the prefetcher and the BPU (resolution logic). It is also used to access the target cache in the same clock (through the multiplexer 170), which is required to handle the case of a COF in the same block as the target.

TACY is used for far COFs to provide the limit to the resolution logic. Far COFs are exclusive instructions, which can use the resources of both pipe stages—ACX is used for address calculation, and ACY is used for the limit.

2.3.1. Target Cache

Referring to FIG. 5a, the target cache 110 holds the target addresses of predicted taken branches and UCOFs. A COF target address is associated with a prefetch address—up to eight COFs can be stored per 16 bytes of instruction, with a different prefetch address assigned to each one. From Section 2.2.3, the prefetch address used in accessing the target cache is the basic block address BBA—either a memory aligned Low/High Block prefetch address, or a target prefetch address supplied by the BPU.

The exemplary target cache is 4-way set associative, with 256 entries. Banking is used to support split prefetching, with each bank containing an 8 byte Low/High block of the 16 byte prefetch (seem/section 2.3.1.1).

Figure 5B:
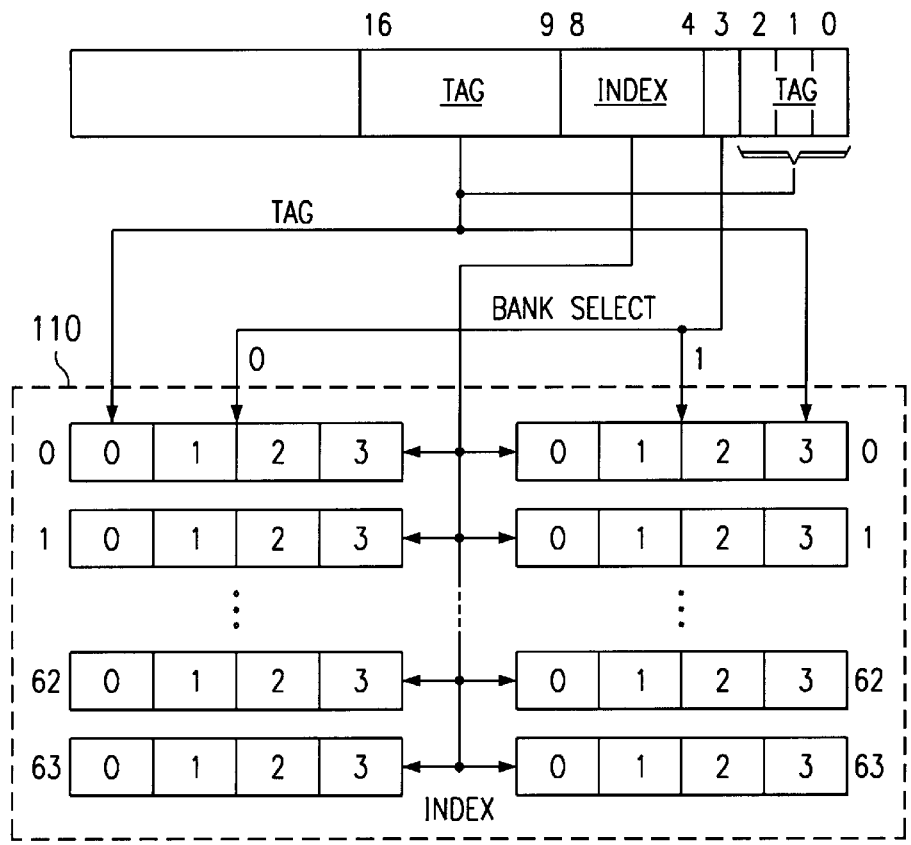
FIG. 5b illustrates the organization of the target cache, including Hi/Lo banking to support split prefetching with bank selection using bit [3] of the prefetch request address such that the Low Block of the prefetch request may be stored in either bank.

FIG. 5b, further illustrates the organization of the target cache. For the exemplary target cache, each entry in the target cache is partially tagged with 17 bits of the BBA prefetch address. Bits[8:4] are used as an index to select 1 of 64 sets in each bank, and Bit 3 is used for bank selection. Bits[16:910 and 2:03:1] are used as the tag to select, for each bank, 1 of 4 ways in each set.

The index is moved up to bits [8:4] to make more efficient use of the array. Referring to FIG. 4a, the BBA for a COF will be block aligned (BBA0 and BBA2) for the 8 byte block containing the COF (i.e., the low three bits will be zero), except when the COF is reached through a target address such that the BBA is the address of the target (BBA1 and BBA3). Therefore, indexing using the low three bits of the BBA would effectively reduce the size of the target cache (with the effective reduction depending on the number of COFs in the code stream), because a disproportionate number of COF's will have their low 3 bits equal to zero.

The target cache is accessed with (a) the prefetch address, or (b) the target address either from the target cache (for BPU hits) or from AC1 (for undetected COFs). When the prefetcher generates the prefetch address during sequential prefetching, it supplies both the Low and High Block addresses in the same clock —if the target address is supplied by the target cache or AC1, the prefetcher will supply only the Low Block address unless the High Block address can be generated by toggling bit [3] (see, Section 2.2.4).

The target cache 110 includes eight tag and valid comparators 112, four for each bank. When the prefetcher supplies both the Low and High Block addresses, both banks are accessed—otherwise, only one bank is accessed (depending on the state of the bank select bit [3]). Thus, for each access, the target cache will perform 4 or 8 tag comparisons—if the access hits, the tag and valid comparators 112 will select for output the corresponding target address.

For BPU hits, I/O logic 114 outputs the selected target address to the prefetcher and the resolution logic 150. The cache I/O logic also demultiplexes (not shown) a resolved target address from the resolution logic for storing an entry into the target cache.

In addition to the tag and index bits, each target cache entry contains a 32 bit COF target address, together with:
a history bit,
3 COF location bits,
a RAS enable bit,
an FTC enable bit
4 FTC index bits
a valid bit.

The history bit is used to predict the direction of a branch (see, Section 2.4). The exemplary embodiment uses a two bit prediction algorithm—only one history bit is required to be stored in the target cache because it only stores taken predictions (the history cache stores the history for not-taken predictions). Specifically, the four states are:

| | | |
|---|---|---|
| Strong Not-Taken | 00 |
| Weak Not-Taken | 01 |
| Weak Taken | 10 |
| Strong Taken | 11 |

Note that the most significant bit for the taken states is 1, and for the not-taken state is 0. Since the target cache only stores taken predictions and the history cache only stores not-taken predictions, only the least significant state bit need be stored to differentiate the four states.

The COF location bits identify the address of the COF within an 8-byte block. The COF location is used in COF confirmation—the Decoder confirms a predicted COF (i.e., a COF in which the target cache supplies the target address) by decoding a COF at the location specified by the COF location supplied by the target cache. (see, FIG. 4c).

The RAS enable bit is used to enable the return address stack 130 for predicted returns (see, Section 2.3.3). This bit is stored in the entry for the associated call.

The FTC index bits are used in the case of a far COF to access by indirection the far target cache 140, which stores the limit and mode bits for far COFs (see, Section 2.3.4). The target cache stores the far target addresses for far COFs.

The BPU is flushed on reset. Moreover, if paging is enabled, the BPU should be flushed when the TLB (in ATU 50, FIG. 1a)is flushed—because the exemplary BPU stores linear addresses, flushing the TLB without flushing the BPU (target cache, history cache, and return stack) may result in BPU addresses aliasing to different pages in memory (including peripheral device memory which should not be read in response to a prefetch request.

Partially tagging the target cache using only 17 bits of the 32 bit prefetch address—index bits [8:4], bank select bit [3], and tag bits [16:9 and 2:0] allows aliasing in the target cache, which reduces the size of the target cache, but results in incorrect predictions (i.e., predicted COFs are not confirmed). In particular, allowing aliasing does not significantly increase complexity because COF confirmation is still required, even for a fully tagged target cache, due to indirect jumps, and compatibility for self-modifying code. Whether to allow aliasing, or the degree of aliasing is a design choice.

For the exemplary embodiment, the target cache is single ported. A dual ported cache would have certain advantages known to those skilled in the art, but would significantly increase die area.

2.3.1.1. Hi/Lo Banking

Referring to FIG. 5b, an exemplary target cache 110 uses banking to support split prefetching. The target cache is organized as 4 way set associative for each bank [0–1]—each bank has 64 sets (lines) [0–63], with each set having 4 ways [0–3].

A Low or High 8 byte Block can be stored in either bank, depending upon the bank select bit [3] of the Low/High prefetch addresses. That is, Bank0 contains target addresses for which the BBA prefetch address has a 0 in bit 3, addressing 8 bytes of the prefetch (Low or High Block). Either Bank0 or Bank1 can be accessed first with the Low Block prefetch address, with the other Bank being accessed with the High Block prefetch address.

Banking is advantageous for the exemplary design in which the prefetch size is 16 bytes but COF detection is implemented for 8 byte blocks. As a result, each prefetch request requires two accesses to the target cache—with both the Low Block prefetch request address and the High Block prefetch address. An exception is where only a Low Block prefetch is performed using a target address supplied by AC1 (see, Section 2.2.4)

In effect, banking the target cache enables the access to be performed as if there are two caches. Both banks are accessed independently using the bank select bit [3], and each bank is indexed as 4 way set associative, with the tag comparison logic 112 providing tag comparison for each of four tags from the indexed set. The tag comparison logic for each bank signals hit/miss—if both banks hit, the Low Bank is selected (see, Section 2.3.1.2)

2.3.1.2. Read/Prioritization

Referring to FIG. 3a, the target cache 110 is accessed with (a) the prefetch address, or (b) the target address from a target cache hit or from AC1 for a previously undetected COF (over TACX) at the same time it is supplied to the prefetcher for fetching the target. NP requests are treated similarly—fetches in the not-predicted direction are used to access the target cache, and the data associated with hits are stored in the associated NP registers for use in case of repair to the not-predicted path.

Figure 5C:
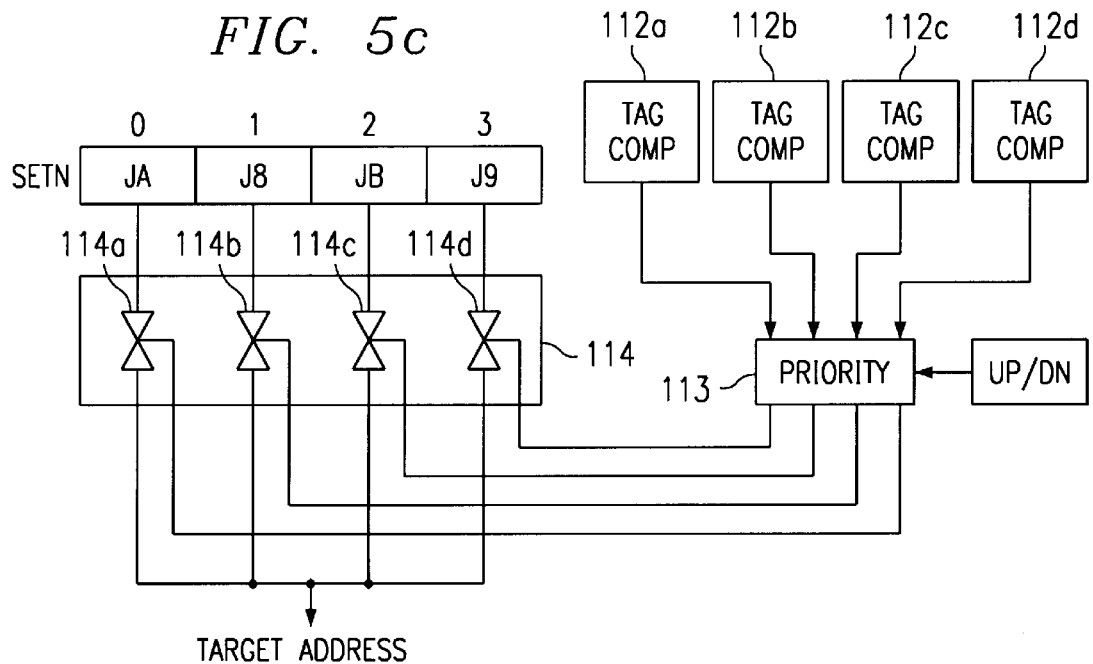
FIG. 5c illustrates a TC hit prioritization scheme for prioritizing multiple target cache hits from a single prefetch address access.
Figure 5D:
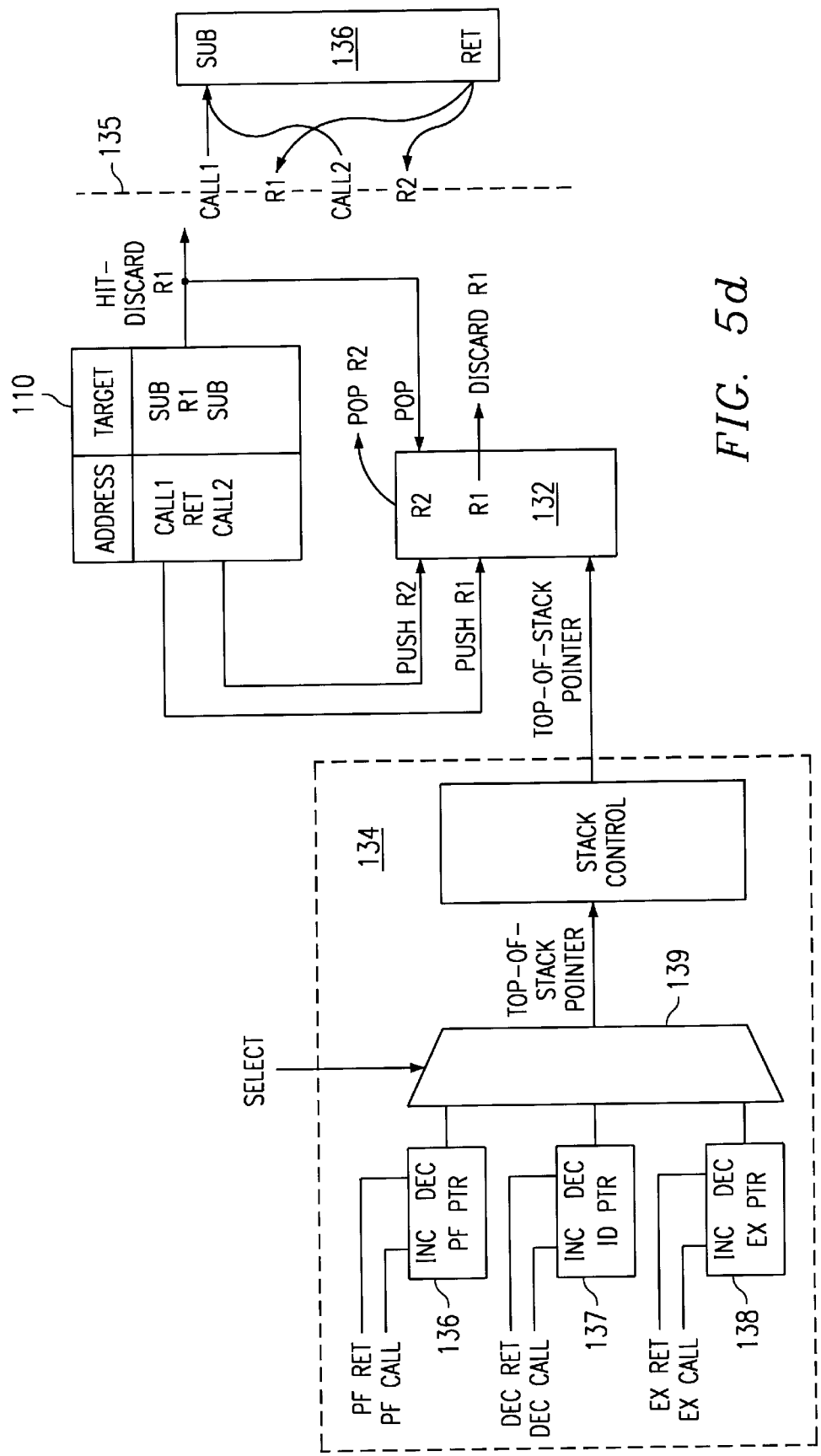
FIG. 5d illustrates the operation of the return address stack, including the use of PF, ID, and EX return stack pointers.

FIG. 5c illustrates a TC hit prioritization scheme for prioritizing multiple target cache hits from a single prefetch address access. This scheme allows a target cache design to avoid the conventional approach of reading the target cache prior to update to detect whether an entry has already been allocated for the tag associated with the update—this conventional approach would require reducing cache bandwidth available for prefetch accesses, dual porting the cache, or duplicating the tags.

FIG. 4d illustrates a situation in which the basic block address BBA8/9 is assigned to two different COFs, branches J8 and J9—this situation can occur if J8 switches from a not taken to taken prediction. In this situation, if the target cache does riot use a read-before-write update protocol, then both COFs may be entered in the target cache tagged with the same basic block address BBA8/9—specifically, J8 may be entered into a different way of the same set containing J9, with both COFs having the same tag (i.e., the BBA8/9 address of the 8 byte block containing both COFs).

Referring to FIG. 5c, the tag comparators 112 and I/O logic 114 for one bank are illustrated. One set (line) n of the bank is illustrated, which is selected by the index bits of the prefetch address used to access the target cache—for each way, the corresponding entry is presented to the I/O logic 114 for output selection.

Four tag comparators 112a–112d, one for each way compare the tag bits of the prefetch address (i.e., [16:9 and 2:0] with the corresponding tag bits from respective entries (ways) of the selected set. As indicated, the same prefetch address may hit on multiple entries in a set.

The hit/miss output of the tag comparators 112a–112d is input to priority logic 113. For target cache 20 hits, the priority logic selects one of the I/O pass gates 114a–114d as the target address output from the target cache.

The priority logic is used to prioritize the target cache output from the I/O logic 114 when more than one tag comparator 112a–112d signals a hit. In determining hit priority, the priority logic also receives an up/dn signal—based on the state of the up/down signal, the priority logic selects one of the duplicate hits for output through the I/O logic.

Referring also to FIG. 5b, each of the 64 sets (lines) in a bank has associated with it an up/dn bit (not shown). For each access, when the selected set is presented to the I/O logic 114, the up/dn bit is read for input to the priority logic 113.

The exemplary hit prioritization technique involves:
if both banks hit, prioritize bank 0
if multiple entries in set hit, prioritize either (up) way 0 to 3, or (dn) way 3 to 0 such that the most recent COF is selected for output by the target cache.

Specifically, for multiple entries in a set (bank), the state of the up/dn bit for that set determines whether the prioritization is up/dn in terms of way number.

For the exemplary hit prioritization scheme, the up/dn bit is set based on the occurrence of an alternate hit. Specifically, when a COF entry is written into the target cache, the up/dn bit for the set containing the entry is set according to:

```
if (wr_way <= alternate_hit_way then
    up/dn = 0
else
    up/dn = 1
``` where wr_way is the way (0,1,2,3) into which the COF is written, and alternate_hit_way is the way number of another COF that hit at the same prefetch address, and where up/dn=1 is dn [3–0] prioritization, and up/dn=0 is up [0–3] prioritization.

Thus, if the way number specified by wr_way is less than or equal to the way number of the alternate_hit COF, the up/dn bit for the indexed set is set as 0 (up prioritization) such that the next time that prefetch address is encountered, the prioritization logic 113 will prioritize up the ways and select the new COF entry. Similarly, if wr_way is greater than the way number of the alternate hit COF, up/dn will be set to 1, and the prioritization logic will prioritize down to select the new COF entry.

The wr_way for the COF entry is selected according to:

```
if (cof_miss)
    if(empty_way_available)
        wr_way = empty_way
    else
        wr_way = random_way
else
    wr_way = hit_way
``` where (a) for COFs that miss in the target cache, (i) empty_way is an empty way (entry) in the indexed set (line) (which is determined from the corresponding prefetch address), and (ii) random_way is a way number determined by the pseudo random replacement algorithm for the target cache, and (b) for COFs that hit in the target cache, hit_way is the way that caused the prefetch address to hit.

Referring FIGS. 4d and 5c, assume that set n previously included COF J9 in way 3 and then J8 switched from a prediction of not-taken to taken and was entered into the target cache in the same set (same BBA8/9) and in way 1 (ways 0 and 2 being occupied by COFs JA and JB with the same index but different tags). According to the exemplary prioritization scheme, the up/dn bit for set n will be set to 0 such that the next time the prefetch address corresponding to BBA8/9 is encountered, the prioritization logic will prioritize up and the target cache hit will result in the output of J8 rather than J9.

If a prefetch access for a new COF results in more than one tag hit, the prioritization logic will capture both hits and implement the prioritization scheme with two alternate_hit_way values. The new COF will, if possible, be written into a way with the up/dn bit being set such that the next time the prefetch address is encountered, read prioritization will select the most recently entered COF.

Figure 6A:
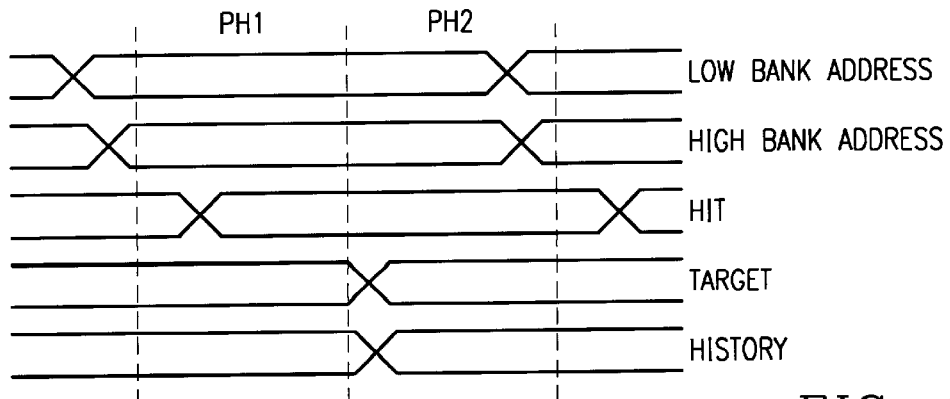
FIGS. 6a and 6b illustrate read and write timing for the target cache.

FIG. 6a illustrates the read timing for the target cache. Note that the access with the Low and High Block address (where both are provided, occurs in the same clock (phi). Note also that the target becomes the next Low Bank address for accessing the target cache.

2.3.1.3. Write/Update

The target cache is updated by the resolution logic 150, with entries being replaced according to a pseudo random replacement algorithm. Recall that BPU misses may result from either predicted not-taken branches (including previously undetected branches) or previously undetected UCOFs. For previously undetected UCOFs, a new entry will be allocated in the target cache. For branches—both predicted not-taken and previously undetected—the decision to store the target address depends upon the branch prediction algorithm implemented by the resolution logic 150 in conjunction with the branch history cache 120 (see, Section 2.3.5).

Figure 6B:
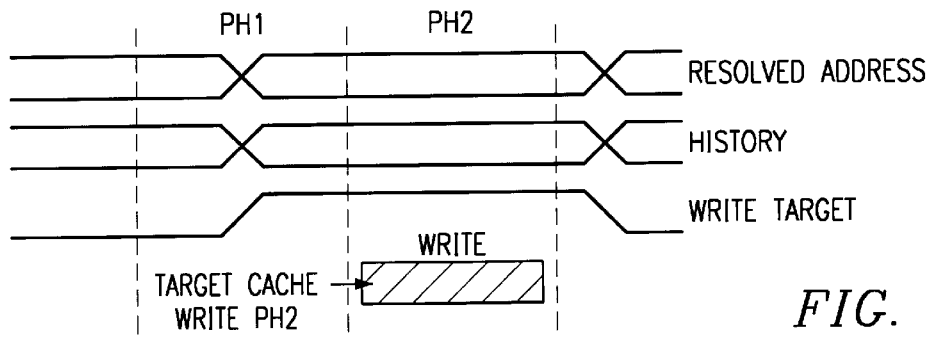

FIG. 6b, illustrates the timing for the write protocol for the target cache. The resolution logic receives (a) the COF address and the associated BBA in ID2, (b) the target address in AC1, and (c) the target and direction from EX/WB.

For UCOFs, the target cache is written after (a) AC1 supplies the target address over TACX, and (b) all previous outstanding COFs have been retired—the target cache will be written with a new entry in either AC2 (PH2) (if there are no outstanding COFs), or EX/WB (PH2). That is, for UCOFs, while the target is validated in AC1, an entry is not allocated into the target cache until the COF executes (i.e., is not flushed due to a repair attributable to a COF further down the execution pipe). Recall that COFs are issued only into the X-pipe, and so are retired in order.

For branches either predicted (taken or not-taken) or previously undetected (assigned weak not-taken), the target cache is written only after the branch is resolved in EX or WB. Resolution involves a comparison of both address and direction: (a) the predicted target address is compared to the actual (calculated) target address in AC2 (PH1), and (b) the predicted direction is compared to the actual direction in EX/WB (PH1). The target cache is written in EX/WB (PH2): (a) for correct taken predictions, the history bit might have to be updated, and (b) for incorrect weak not-taken predictions, a new entry is written with the target address and associated history bit.

2.3.2. History Cache

Referring to FIG. 5a, the branch history cache 120 holds the history bits for branches predicted not-taken—the BPU will miss on these branches. The history cache does not affect branch execution, but merely supplies history information to resolution logic 150 for use in determining whether to update the target cache 110.

The exemplary branch history cache is direct mapped, with 128 entries. Each entry is used to store one history bit for the predicted not-taken branch—as described in connection with the target cache, only one history bit is needed for the exemplary the two-bit prediction algorithm because the history cache is only used for predicted not-taken (weak or strong) branches. The history cache is indexed with COFID [8:2], with COFID[10:9, 0] being used as a 3 bit tag. That is, for the exemplary embodiment, the history cache uses a reduced number of tag bits, which makes aliasing possible. Referring to FIGS. 3 and 5a, branches that miss in the target cache 110 are decoded in ID1. The COF address is supplied over COFID in ID2—the 7 index bits select 1 of 128 entries. A tag and valid comparator (not shown) detects a tag match, and whether the entry is valid. The COF address will hit in the history cache for predicted not-taken branches (weak or strong), and the selected history bit will be provided to the resolution logic, for use in branch resolution during EX/WB.

Note that exemplary history cache need not be accessed with the prefetch address because its output is only needed by the time the predicted not-taken branch resolves in EX or WB. Thus, the COFID available in ID1 is used to access the history cache in ID2—for a hit, the associated history information is provided to the resolution control logic 154 by the end of ID2.

The resolution logic 150 implements the exemplary branch prediction algorithm, and based on the current history and the actual direction of the branch, the resolution logic:

for a correct not-taken prediction of a previously detected branch, may write a new history bit into the history cache (i.e., weak to strong), for a correct not-taken prediction for a previously undetected branch, write a new entry into the history cache with a strong not-taken history, or for a mispredicted not-taken branch for which the prediction stored in the history cache is weak not-taken, write a new entry into the target cache.

The resolution logic reads the history cache over THIST, and writes it over RHIST—The history cache is written in EX/WB (PH2).

Figure 6C:
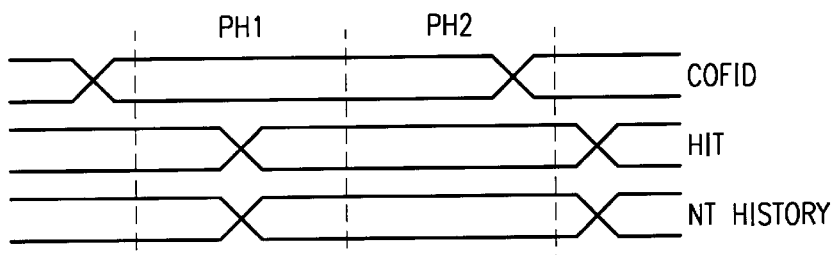
FIGS. 6c and 6d illustrate read arid write timing for the history cache.
Figure 6D:
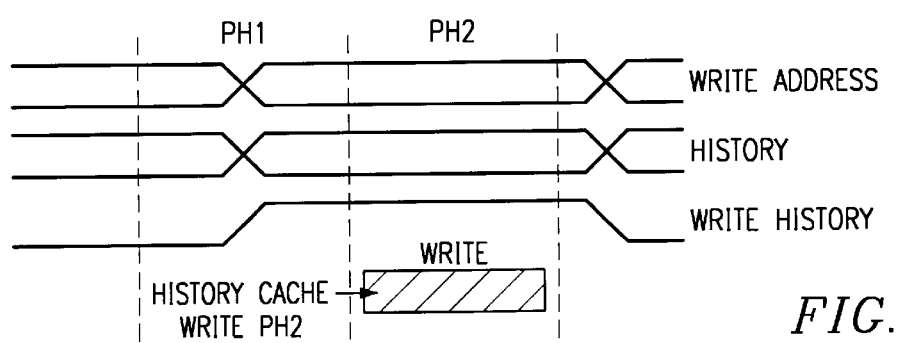

FIGS. 6c and 6d illustrate the timing for the write and read protocols for the history cache.

Allowing aliasing in the history cache involves the same considerations as were discussed in connection with the target cache.

The BPU could have been designed to store predicted not-taken branches (and the associated history bits) in the target cache. However, by taking advantage of the normal fall through to supply the target address, more entries in the target cache are available for storing predicted taken branches (and UCOFs), thereby enabling more COFs to be predicted. Moreover, separating predicted taken and not-taken branches reduces the need to access multiple branches per prefetch, and helps alleviate the need for dual porting the target cache.

2.3.3. Return Address Stack

Referring to FIG. 5a, the return address stack 130 holds the address of the instruction following near and far calls, which is used to predict the target address of the associated return. The return address stack 130 includes a return stack 132 and stack control logic 134.

The advantage of the return address stack, is illustrated by a sequence of printf calls:

printf ("%d", i)
printf ("%d", j)
printf ("%d", k)

If returns were stored in the BPU target cache, the return in each printf call would access the same location, because they are at the same location in the subroutine. However, the return target cached would be for the instruction following the previous printf call, and would be incorrect for the current one. A sequence of subroutine calls could fill the target cache with useless information.

The exemplary return address stack is 8 entries. Stack control logic 134 controls stack operation—it is enabled for a given call-return pair either (a) by the RAS enable bit stored with an associated call entry in the target cache, or (b) for a previously undetected call, by the decode logic. In particular, the second and subsequent times that a call/return pair is seen by the BPU, the return target address is (a) pushed onto the stack when the call hits in the target cache during prefetch, and (b) popped off the stack when the return hits in the target cache.

FIG. 5c illustrates the operation of the return stack 132 in connection with a sequence of calls. A code sequence 135 contains a sequence of two call instructions CALL1 and CALL2 each with an associated return R1 and R2. Each call is for the same subroutine 135, defined by a subroutine address SUB and a return instruction RET—the subroutine address SUB is the target address for the call instructions CALL1 and CALL2, while their associated returns R1 and R2 are the target addresses for the return instruction RET.

The first time through code sequence 135, CALL1 misses in the target cache 110. When CALL1 is decoded: (a) the CALL1 target address SUB is supplied to the prefetcher for prefetching the subroutine 135, (b) the CALL1 prefetch address and its target address SUB are stored in the target cache 110, and (c) its associated return RI is pushed onto the return address stack 132.

After the subroutine 135 executes, the return instruction RET will also miss in the target cache 110—decoding the RET will result in: (a) the RET target address R1 being supplied to the prefetcher for prefetching into the code sequence 135, and (b) the RET prefetch address and its target address R1 being stored into the target cache. In addition, decoding a RET that misses in the target cache will result in the return address stack being POPPED and the resulting return target address R1 being discarded to maintain return stack integrity (it being assumed that each return has an associated call).

Execution after the return R1 continues with CALL2 to the same subroutine 136, which will also miss in the target cache 110 (because the prefetch addresses for CALL1 and CALL2 are different). When CALL2 is decoded: (a) the CALL2 target address SUB is supplied to the prefetcher for prefetching the subroutine 136, (b) the CALL2 prefetch address and its target address SUB are stored in the target cache, and (c) its associated return R2 is pushed onto the return stack 132. This time, after subroutine 135 executes, the return instruction RET hits in the target cache, and instead of supplying the corresponding R1 target address stored in the target cache, the return stack is enabled to POP the return target address R2 (which was pushed by the call instruction CALL2).

Thus, the second and subsequent times the CALL to the subroutine 136 is seen, the return address stack supplies the corresponding return target address (R2 for CALL2, etc.).

For deeply nested code sequences, the return stack may underflow. For the exemplary embodiment, if a return instruction RET hits in the target cache but the return stack is empty, then the prediction is made using the associated target address stored with the RET prefetch address. For example, for the code sequence 135, if the return stack 132 is empty when RET hits, the target cache 110 will supply the target address R1 to the prefetcher. This address will be right at least some of the time (because the associated call instruction may not be in a sequence of calls), and predicting the target for a UCOF wrong is no worse (performance wise) than not predicting at all.

The return stack implementation of the exemplary embodiment permits return target addresses to be dynamically allocated to and recovered from the stack. It is effective for both predicted calls that hit in the target cache, and for previously undetected calls that are decoded at ID1 where the return is cached.

FIG. 5c illustrates an exemplary scheme for repairing the return stack 132 in the case of a sequence of nested calls, where one of the called subroutines includes a branch that is mispredicted or a UCOF that is undetected or unconfirmed ("repair conditions). Return stack repair involves the use of three separate return stack pointers—PF, ID, and EX.

Return stack 132 operates conventionally using a top of stack pointer and valid bits. A PUSH is accomplished by storing valid data in a return stack location and moving the pointer to that location. A POP is accomplished by reading the top of stack location, invalidating that location, and moving the top-of-stack pointer to the next location.

Consider the following call/return sequences where return stack repair is in issue: (a) RET, (b) CALL, (c) CALL/RET, and (d) RET/CALL. In each case, it is assumed that the CALL or RET should not have been allowed to modify the return stack because of a repair condition.

The RET situation results in an incorrect POP off the return stack. The repair is to (a) move that top-of-stack pointer up to the location just PC/IP-ed, and (b) validate that location.

The CALL situation results in an incorrect PUSH. The repair is to (a) move the top-of-stack pointer down to the next location, and (b) invalidate the location just PUSH-ed.

The CALL/RET situation results in an incorrect PUSH/POP. Because this sequence cancels, no repair is required.

The RET/CALL situation results in an incorrect POP/PUSH. This sequence cannot be repaired because the data at the RET location has been corrupted by the incorrect PUSH. However, the pointer location is correct, and the rest of the return stack is valid.

Return stack control 134 includes pointer control logic that correctly adjusts the return stack pointer, including in the case of the above repair conditions—separate location validation logic (not shown) correspondingly controls the state of the valid bits for each location in the return stack. The pointer control logic includes PF pointer logic 136, ID pointer logic 137, EX pointer logic 138, and a pointer mux 139. Mux 139 controls the pointer to the top of the return stack 132.

PF pointer logic 136 maintains the normal return stack pointer that is used during normal prefetch operations involving calls and returns that hit in the target cache (i.e., other than for return stack repair conditions). The PF pointer is incremented for prefetched call hits and decremented for prefetched return hits—if the PF pointer is selected by the mux 132, the return stack pointer will be adjusted accordingly for normal returns stack operation.

For the repair condition in which a CALL/RET is unpredicted or unconfirmed, mux 139 selects, instead of the normal PF pointer from PF pointer logic 136, the ID pointer from ID pointer logic 137. The ID pointer is incremented when a call that hits in the target cache is confirmed, and decremented when a return hits. Thus, if a call or return hits in the BPU, mux 139 will select the PF pointer to move the top-of-stack pointer—if the call/return is not confirmed, then mux 139 will select the ID pointer, which correspondingly will not have been incremented/decremented, thereby adjusting the top-of-stack pointer to repair the return stack.

For the repair condition in which a branch preceding a CALL/RET that has already hit in the BPU is mispredicted, then mux 139 will have already selected the PF pointer for the call/return to move (incorrectly) the top-of-stack pointer. When the branch resolves in EX/WB as mispredicted, mux 139 selects the EX pointer, which correspondingly will not have been incremented/decremented, thereby adjusting the top-of-stack pointer to repair the return stack. For the exemplary implementation of the BPU which includes a far target cache that stores segment limits as well as mode bits for far targets (see, Section 2.3.4.1), the exemplary return address stack stores predicted return targets, and associated limits and modes. Far calls are exclusive instructions in which the Y-pipe is used to calculate limits—the far segment limit calculated in AC2Y is supplied to the return stack from a dedicated register (not shown). Because the return stack has relatively few entries, the design choice was to include space in a single return stack for limits and modes, rather than have a separate cache (as was used for far jumps).

For the alternative embodiment of the BPU in which a separate far target cache is not used, but rather the target cache stores far target modes but not segment limits (see, Section 2.3.4.2), the return stack is modified to only store target address and mode bits—as with the target cache, the 32 bit far target segment limits are not stored.

2.3.4. Far Targets

Two alternative designs are disclosed for storing far targets in the BPU. The exemplary approach is to select one or the other of the designs based on whether the processor is optimized for the 486 generation or 586/686 generation computer systems. In particular, for 486 generation computer systems, the processor is not allowed to prefetch beyond a segment limit (thereby preventing any prefetch from above physical memory), while for the 586/686 generation computer systems, the computer system is required to handle fetches beyond physical memory).

2.3.4.1. Far Target Cache

Referring to FIG. 5a, for a 486 generation computer system, the exemplary BPU includes a far target cache 140 that stores for each far target entry, both the bit segment limit and mode bits (far jumps, calls, and returns). For the x86 architecture, segment limits are 32 bits, and 9 mode bits are used.

The use of a separate, indirectly accessed far target cache for limits and mode bits is advantageous because it avoids having to expand the size of the entire target cache to accommodate the 41 additional limit and mode bits, particularly with far COFs being relatively infrequent.

The far target cache is direct mapped with 16 entries. Each entry includes the limit and the mode for a far target address in the target cache. Four FTC bits are stored with the associated far target entry in the target cache, selecting the appropriate one of the 16 entries.

Figure 5E:
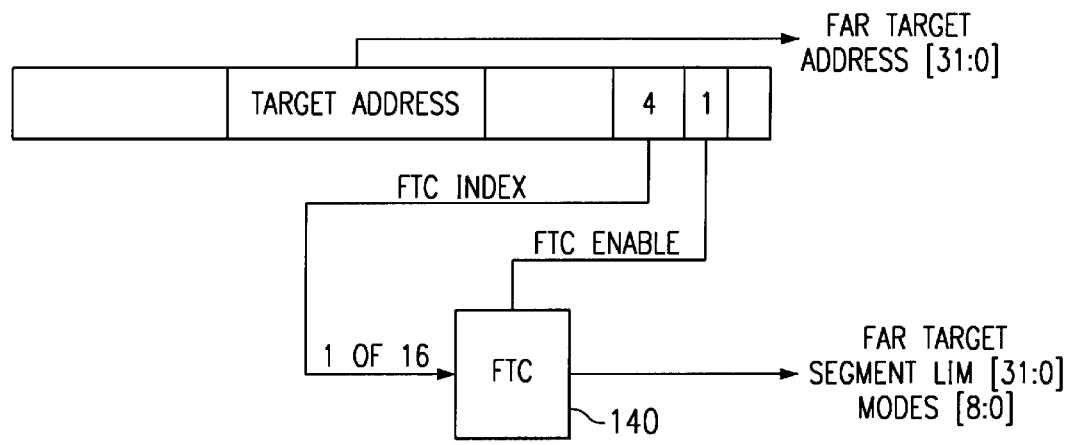
FIG. 5e illustrates the use of a far target index field in each entry in the target cache, such that for far targets the far target index is used to access by indirection a far target cache to obtain the associated 32 bit segment limit and 9 mode bits for the far target.

FIG. 5e illustrates the use of the FTC enable bit and the FTC index field in an entry in the target cache in accessing the far target cache by indirection. When the prefetch address for a far COF hits in the target cache 110, the target cache outputs the predicted target address to the prefetcher. At the same time, the FTC enable bit enables the far target cache, while the 4 FTC bits select 1 of 16 entries to supply the associated segment limit and mode bits.

When an entry in the far target cache needs to be replaced, the resolution logic implements a far target LRU as part of its LRU for the target cache.

2.3.4.2. Target Cache

Figure 5F:
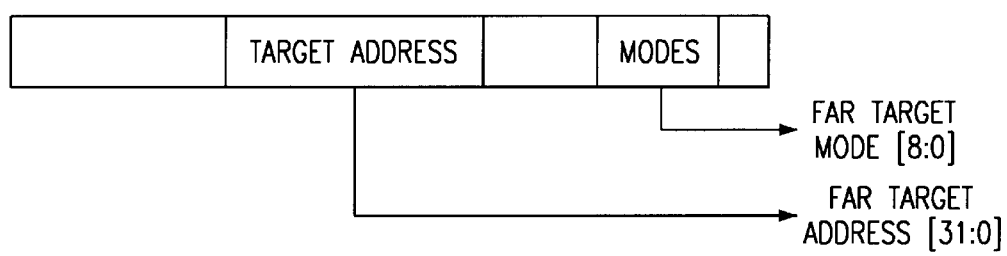
FIG. 5f illustrates a far target prediction scheme in which each entry of the target cache includes a mode field, but not a segment limit field, and in which the far target cache is eliminated.

FIG. 5f illustrates a far target prediction scheme for 586/686 computer systems, in which the far target cache is eliminated—each entry of the target cache includes a mode field, but not a segment limit field. The target cache 110 stores far COF modes, along with the far targets—far COF limits are not stored.

This alternative design for the BPU takes advantage of the fact that, for 586/686 computer systems, the processor is not required to ensure that a prefetch in response to a far COF will not exceed the far segment limit. Accordingly, it is a reasonable design choice to forgoe caching the 32 bit code segment limit and inhibiting prefetching beyond the segment limit.

Caching the mode bits for far COFs is still advantageous because they are needed in decoding subsequent instructions. Including the 9 mode bits in the target cache 110 expands the size of each entry of the target cache by 3 bits (9 mode bits less the far target indirection bit and the 4 index bits), but eliminates the need for a far target cache and the associated complexity, and as such is an acceptable design tradeoff.

Thus if a far COF hits in the target cache 110, the BPU supplies both the far target and the associated mode bits. The prefetcher will prefetch the far target—far segment limit checking will be performed when the far target reaches the AC stage.

2.3.5. Resolution Logic

Referring to FIGS. 3 and 5a, the BPU resolution logic 150 performs three basic functions: (a) Speculation Control including controlling the issue of branches and floating point instructions (speculation instructions), (b) COF Resolution including resolving predicted target addresses (branches and UCOFs) and predicted direction (branches), and (c) Pipeline Repair including controlling the restoration of checkpointed processor resources after a branch misprediction or a floating point exception. In addition, the resolution logic performs branch prediction including implementing an exemplary two-bit branch prediction algorithm (see, Section 2.5).

The basic functions of speculation control, COF resolution, and pipeline repair are discussed in Section 2.5. This subsection focuses on an exemplary logic implementation.

The resolution logic 150 includes resolution buffers 152, resolution control 154, and speculation level logic 156. The resolution buffers store information used for COF resolution and speculative execution. The resolution control performs the following functions: (a) reads and writes the target cache 110 and history cache 120, and writes the limits and modes into the far target cache 140 (if a far target cache is used), (b) allocates and deallocates the resolution buffers in connection issuing COFs and floats, and (c) controls COF resolution and pipeline repair.

The resolution control 154 receives the following inputs from the CPU core:

| | |
|---|---|
| COFID | Linear address (instruction pointer) of a COF decoded in ID1 |
| TACX | Target physical address from AC1 in the X-pipe |
| TACY | Target physical address from AC1 in the Y-pipe |
| TDIR | Direction of a branch in EX or WB |
| ICOF | COF instruction interjected by AC or EX for exceptions and interrupts |

In addition, the CPU core supplies TMODES (target modes) for use in connection with far COFs.

Interface to the target cache 110, history cache 120, and far target cache 140 is as follows:

| | |
|---|---|
| TA | Target Address received from the Target Cache |
| RA | Resolved Target Address written into the Target Cache |
| THIST | History bit read from the History Cache |
| RHIST | Resolved history bit written to the History Cache |
| FL/M | Far Limits and Modes for a far COF in the Target Cache |

In addition, the resolution logic receives inputs from the FPU that signal when a floating point instruction has either: (a) completed execution, or (b) faulted. These signals are used in speculation control (see, Section 3).

The resolution buffers 152 are allocated in ID2, and resolved in EX or WB. Subject to speculation control, resolution buffers are allocated for (a) branches, (b) UCOFs, and (c) Floats. Resolution buffers are allocated when the COF or float issues from ID2—if a buffer cannot be allocated because of the current speculation level (i.e., four outstanding branches or floats), then the instruction will stall at ID2 until an outstanding speculation instruction is resolved.

Resolution buffer 152 includes four entries, one for each of up to four unresolved COFs or floats (i.e., one for each speculation level). The resolution buffer includes both control and data fields. The control fields are:

| | |
|---|---|
| SET 1:0 | set to use in cache |
| THIST 3:2 | history to write back if branch is taken |
| NTHIST 5:4 | history to write back if branch is not taken |
| TARGM 6 | set when target has been validated |
| TARGMM 7 | set for predicted target mismatch |
| VALID 8 | valid bit |
| PAST_AC 9 | set when branch is past AC1 |
| UCOF 10 | set for UCOF |
| PTAKEN 11 | set if branch is predicted taken |
| FP 14 | set if float instruction checkpointed |
| MID 16 | set if mid pointer is past this entry |
| RETIRED 18 | set if entry retired |
| NOTARG 19 | set if no target for UCOF |
| CALL 20 | set if a call |
| RET 21 | set if a return |
| FAR 22 | set if a far jump |
| BBA 25:23 | basic block address |
| FTC 29:26 | index to the far target cache |

The data fields are:

| | |
|---|---|
| takena [31:0] | target address of COF |
| takenl [31:0] | target limit of COF |
| takenm [8:0] | target modes of COF |
| nta [31:0] | not taken address of COF |
| ntl [31:0] | not taken limit of COF |
| ntm [8:0] | not taken modes of COF |

Three pointers are used to access entries in the resolution buffers. The first points to the next empty location, into which will be allocated the next speculation instruction to be decoded. The second pointer points to the next entry that has yet to have its target address resolved. The third pointer points to the next entry that has yet to have its direction resolved.

For each entry in the resolution buffer, the set number, index number, history bits, and target address are saved so that the target cache 110 can be written with updated history bits and possibly a new target (such as in the case of self modifying code or jump indirects), without re-reading it. Re-reading the target cache upon resolution would complicate the BPU operation, and introduce a resource conflict.

Referring to FIG. 3, for BPU hits, the resolution logic 150 works in conjunction with the hit confirmation buffer 164 in the prefetcher. A confirmation buffer is allocated at the IF stage, and then deallocated into a resolution buffer when the COF is confirmed at ID2. This functional division is a design choice—the function of the hit confirmation buffer could have been incorporated into the resolution logic.

Thus, as implemented in the exemplary embodiment, the prefetcher repairs itself if a COF is not confirmed (i.e., before any instructions are speculatively issued), using the hit confirmation buffer. After a COF is confirmed, when speculative execution commences, the BPU takes over responsibility for repairing both the prefetcher and the ID stage.

2.4. Branch Prediction

Figure 7:
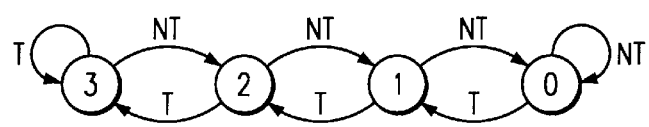
FIG. 7 illustrates a state diagram for the exemplary prediction algorithm.

Referring to FIG. 7, the exemplary branch prediction strategy uses two bits of history stored with each branch. The two bits encode the states 0 through 3 as shown in the diagram. States 0 and 1 will predict a branch not-taken, and states 2 and 3 will predict a branch taken. The transitions between the states are determined by the actual behavior of the branch and is represented by T for taken and NT for not-taken.

2.5. Resolution/Repair

Resolution and repair involves three basic functions: (a) Speculation Control including controlling the issue of branches and floating point instructions (speculation instructions), (b) COF Resolution including resolving predicted target addresses (branches and UCOFs) and predicted direction (branches), and (c) Pipeline Repair including controlling the restoration of checkpointed processor resources after a branch misprediction or a floating point exception.

The speculative execution of instructions past a branch or float may modify the processor state (processor resources) in ID, AC1 and EX. The contents of the register file are read in AC2 and used in EX, and the results are then written back in WB (PH1). Branches are resolved no later than WB (prior to any register file writeback)—floats may fault after a subsequent speculatively issued instruction completes WB.

For the exemplary embodiment, speculative execution extends to writing speculative results into the register file, and reading those speculative results as speculative execution continues. Memory (cache) is not speculatively modified, but rather, writes (and floating point stores) for which a corresponding speculation instruction has not been resolved are queued into the (pre-cache) write buffers (29 in FIG. 1a)—these pending writes are retired as the outstanding speculation instruction is resolved.

If a branch is mispredicted (which will not be known until the EX or WB stage for the branch), or if a float faults (which may be tens or even hundreds of clocks after being issued to the FPU), then the execution pipeline must be repaired to the point of the faulting or mispredicted instruction (i.e., the execution pipeline is flushed behind that instruction), and instruction fetch restarted.

All processor resources that can be changed by speculatively issued instructions prior to the speculation instruction being resolved are checkpointed to allow the processor state to be repaired in the case of a speculation error. However, for the exemplary embodiment, not all processor resources are checkpointed—certain resources that are only used by selected instructions that appear infrequently in the typical code stream are not checkpointed.

As a result of not checkpointing certain processor resources, issue constraints are placed on those non-checkpointed instructions, also referred to as speculation level zero (SLZ) instructions, that during execution will change non-checkpointed processor resources (see, Section 2.5.1). Selecting those resources to not checkpoint involves a design trade-off based on the logic required to checkpoint a resource and the frequency an instruction appears in a typical code stream—that is, the performance penalty associated with stalling the execution pipeline for a non-checkpointed instruction that cannot be speculatively issued (or only issued subject to issue constraints) and the amount of additional resources required for checkpoint and repair associated with the instruction. Those skilled in the art will recognize that a different design trade-off could be made, resulting in different issue constraints.

For the exemplary embodiment, the processor resources that are checkpointed are:

TABLE 1

| | |
|---|---|
| ID | IP |
| AC1 | IP |
| | SP |
| | Register Translation Unit |
| EX | Condition Codes |
| | Application Flags |

Note that the AC (architectural) registers in the AC unit (see, Section 1.1) are not checkpointed—these registers need only be refreshed after a floating point exception (through a read and writeback of the general register file, which also updates the AC registers), but not after a misprediction. Normal instruction sequencing ensures that any branch passing (in the X-pipe) from EX to WB will resolve (WB) in time to abort any write to the AC registers (also in WB) by an adjacent (Y-pipe) speculatively issued instruction. Note also that the register translation unit (25a if FIG. 1a) maintains complete logical-to-physical mapping for the register file, including checkpoint registers (see, Section 2.5.1).

For the exemplary embodiment, the processor resources that are not checkpointed are:

| | |
|---|---|
| AC1 | Segment descriptor registers |
| | Special Registers |
| Ex | System Flags |

For the X86 ISA, special registers include registers for debug, control, test, and cache configuration. Instructions that change these resources during execution can be speculatively issued only under certain constraints.

2.5.1. Speculation Control

For the exemplary microprocessor, the BPU provides speculation control through (a) controlling the issue of COFs and floats, (b) controlling the checkpointing of processor resources, and in the case of a misprediction or floating point exception, (c) repairing the pipeline including restoring processor state.

For the exemplary embodiment, pipeline repair for speculatively executed instructions is implemented by creating checkpoints of the processor state at each pipe stage as a floating point or COF speculation instruction enters that stage. For these speculation instructions, all resources (programmer visible registers, instruction pointer, condition code register) that can be modified by succeeding speculatively issued instructions are checkpointed into a specified checkpoint register.

For the exemplary embodiment, the principle constraints on speculative execution are: (a) speculative execution is allowed for up to four floating point or branch instructions at a time (i.e., the speculation level is maximum 4), and (b) a write or floating point store will not complete to the cache or external memory until the associated branch or floating point instruction has been resolved (i.e., the prediction is correct, or floating point instruction does not fault). In addition, for the exemplary embodiment, certain instructions are issued only if the speculation level is zero (for example, due to not checkpointing infrequently used processor resources such as segment descriptor registers).

Figure 8A:
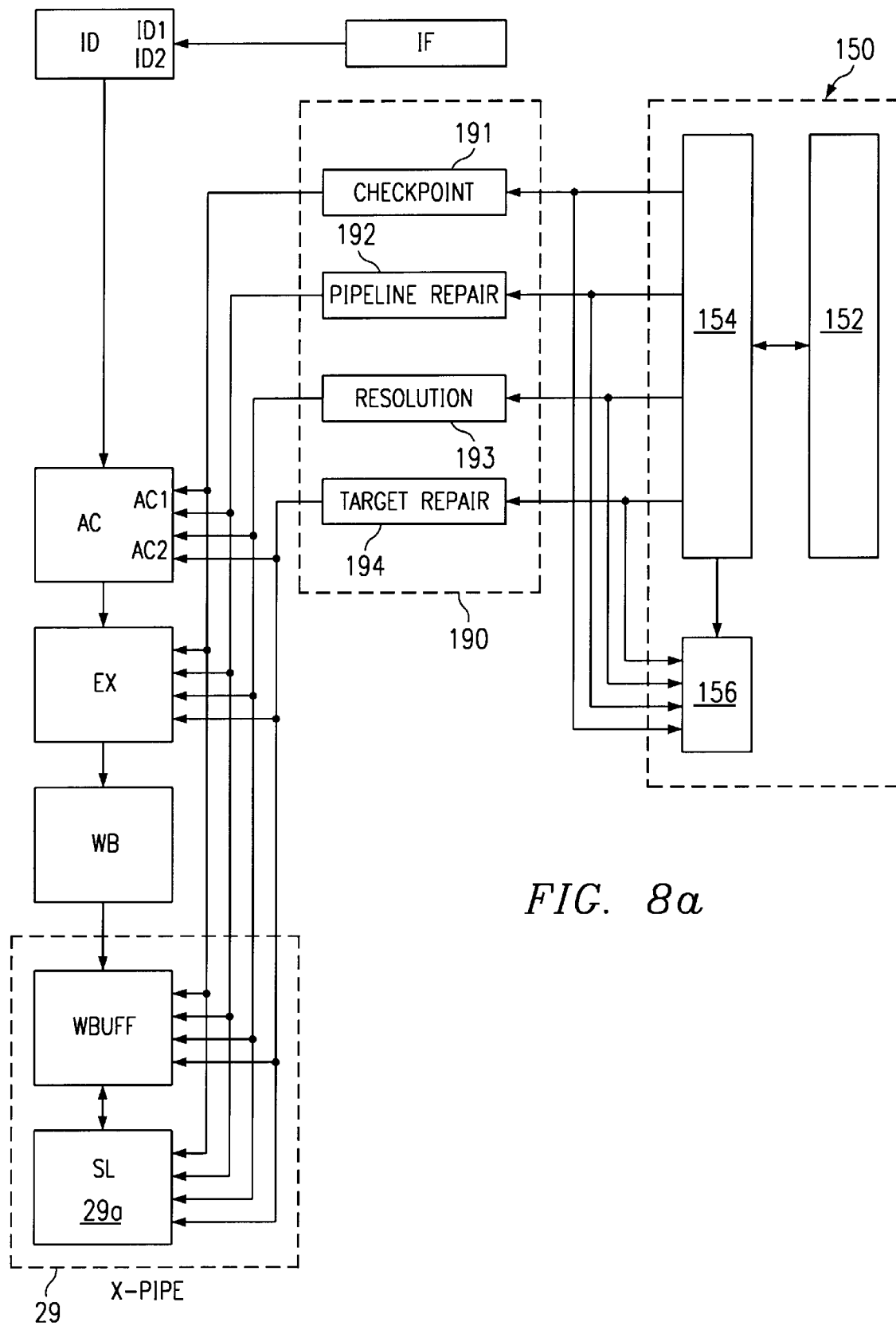
FIG. 8a illustrates speculation control in connection with the branch processing unit.

FIG. 8a illustrates the speculation control logic in the BPU. Resolution control 154 controls the allocation of the resolution buffers 152, and the speculation level maintained by speculation level logic 156.

The speculation level logic identifies the current speculation level of the execution pipeline (which is derived from the valid bits for each of the resolution buffers). As outstanding speculation instructions are resolved, the speculation levels for the pipe stages are: (a) in the case of a retire, decreased, or (b) in the case of a branch misprediction or floating point exception, set to the lowest level in preparation for instruction restart (note that, if a speculative floating point instruction is outstanding, a subsequent branch misprediction need not affect that instruction, but only reduce the speculation level to the level of the branch).

FIG. 8a illustrates only a single execution pipeline—the BPU provides speculation control for both the X and Y pipes, with the implementation for both pipes being identical.

To support speculative execution, the resolution control 154 (a) controls the issue of speculation instructions through the allocation of resolution buffers 152, and (b) controls checkpointing of the processor state through the use of the four speculation control vectors 190: (1) checkpoint 191, (2) pipeline repair 192, (3) target mismatch repair 193, and (4) resolution 194. These vectors are output to the AC and EX stages of the execution pipeline, as well ;s the write buffers 29.

For the exemplary embodiment, resolution control 154 is also responsible for repairing the IF (prefetcher) and ID (decoder) stages after a mispredicted branch or floating point exception—the associated instruction pointers are checkpointed into an allocated resolution buffer 152 for use in restoration during repair. After ID, AC1 and EX are the only pipe stages that have processor resources requiring checkpointing—AC1 checkpoints the instruction and stack pointers and the register translation unit (25a in FIG. 1a), while EX checkpoints the condition codes and applications flags.

In addition, the write buffers 29 queue writes to memory pending resolution of the associated speculation conditions. The write buffers include speculation level logic 29a that, in response to the speculation control vectors from resolution logic 154, retires queued writes by either (a) completing the write if a speculation condition is resolved, or (b) invalidating the write if repair is required.

Speculative Issue

Referring to FIG. 8b, assuming that the speculation level is less than maximum, a confirmed (decoded) COF or float is allocated to an available resolution buffer 152. Upon allocation, the speculation instruction issues from ID2 into the X-pipe (i.e., both branches and floats issue only into the X-pipe). Speculative execution continues with the speculative issue of instructions past the speculation instruction.

When the speculation instruction issues from ID2, resolution control 154 pipes along with the instruction the checkpoint vector 191 to AC1 and EX. The checkpoint vector includes two fields:

| Allocate | Checkpoint Register ID |
| --- | --- |

In response, the pipe stage (AC1,EX) executing the speculation instruction checkpoints its modifiable resources to the checkpointed register specified by the Checkpoint Register ID.

The checkpoint vector is also input to write buffer speculation level logic 29a—write buffers are allocated in AC2.

For the exemplary embodiment, certain issue constraints are required because: (a) the entire processor state is not checkpointed, (b) speculative execution is supported for two types of control hazard instructions— branches (and UCOFs) and floats—that involve significantly different speculative execution conditions, and (c) exceptions (including floating point exceptions) must be handled in program order. These issue constraints are: (a) the speculation level must be less than four for a branch (or UCOF, which is speculative until its target address resolves) or float to issue, (b) a float will issue only if there is not an outstanding branch (i.e., in the branch resolution buffer), and (c) SLZ instructions will only be issued if the speculation level is zero. Note that multiple floats can be speculatively issued—the exemplary FPU maintains a FIFO load queue, thereby ensuring that exception order will be maintained in the FPU.

Those skilled in the art will recognize that these issue constraints are a matter of design choice. In particular, the constraint on issuing floating point instructions is a matter of resolution buffer management for the exemplary implementation.

Checkpointing

Referring to FIG. 1a, for the exemplary embodiment, the checkpoint registers are contained in the register translation unit 25a. In addition to checkpoint registers, the register translation unit includes register renaming hardware.

FIG. 9 illustrates the exemplary checkpoint implementation. Translation control registers 200 are used by the register translation unit for register renaming and checkpointing. A Logical ID register 210 maps logical registers to physical registers. The Size register 212 stores a code corresponding to the size of the logical register to which the physical register is assigned.

The Current register 214 indicates the registers which are the most recently assigned for a given logical register. Thus, every time a new physical register is allocated, the current bit for the physical register which previously was the current register for the corresponding logical register is turned off and the current bit for the newly allocated register is turned on. Consequently, at any time, the Current register has eight bits on and twenty-four bits off. For each physical register, the Pending register 216 has a bit which indicates whether a write to that physical register is pending.

Four Checkpoint registers 218, Chkpnt0–Chkpnt3, are used to store a copy of the Current register 214, each time a checkpoint occurs. In the exemplary embodiment, checkpoints occur whenever a branch or float is issued into AC1. The Checkpoint registers 218 are allocated on a rotating basis.

Checkpointing the stack and instruction pointers in AC1, and the condition codes and applications flags in EX is handled analogously.

Speculation Level

Referring to FIG. 8b, for the exemplary embodiment, BPU resolution logic 150 and write buffers 29 include speculation level logic 156 and 29a respectively.

In the BPU, the speculation level is a function of the valid bits in the resolution buffers 152. The speculation level logic performs logical operations on the valid bits to determine the speculation level—AND-ing the bits is used to determine if a resolution buffer is available for a new speculation instruction (speculation level less than 4), while OR-ing the bits is used to determine if a speculation level zero instruction can issue. All four valid bits together form a 4 bit SPEC (speculation) vector that is included in the pipeline repair vector 192.

In the write buffers 29, the speculation level logic 29a maintains a 4 bit SPEC vector corresponding to the speculation level for each speculative write queued into the write buffer. In response to speculation control vectors 190 from the BPU, the write buffer speculation level logic assigns the appropriate speculation level to each write waiting to be retired. AC and EX are able to store a single 4 bit SPEC vector. This vector is needed because the speculation level maintained by the BPU (i.e., the 4 valid bits of the resolution buffers) may not be the same as that of AC and EX due to pipeline latency.

Figure 10A:
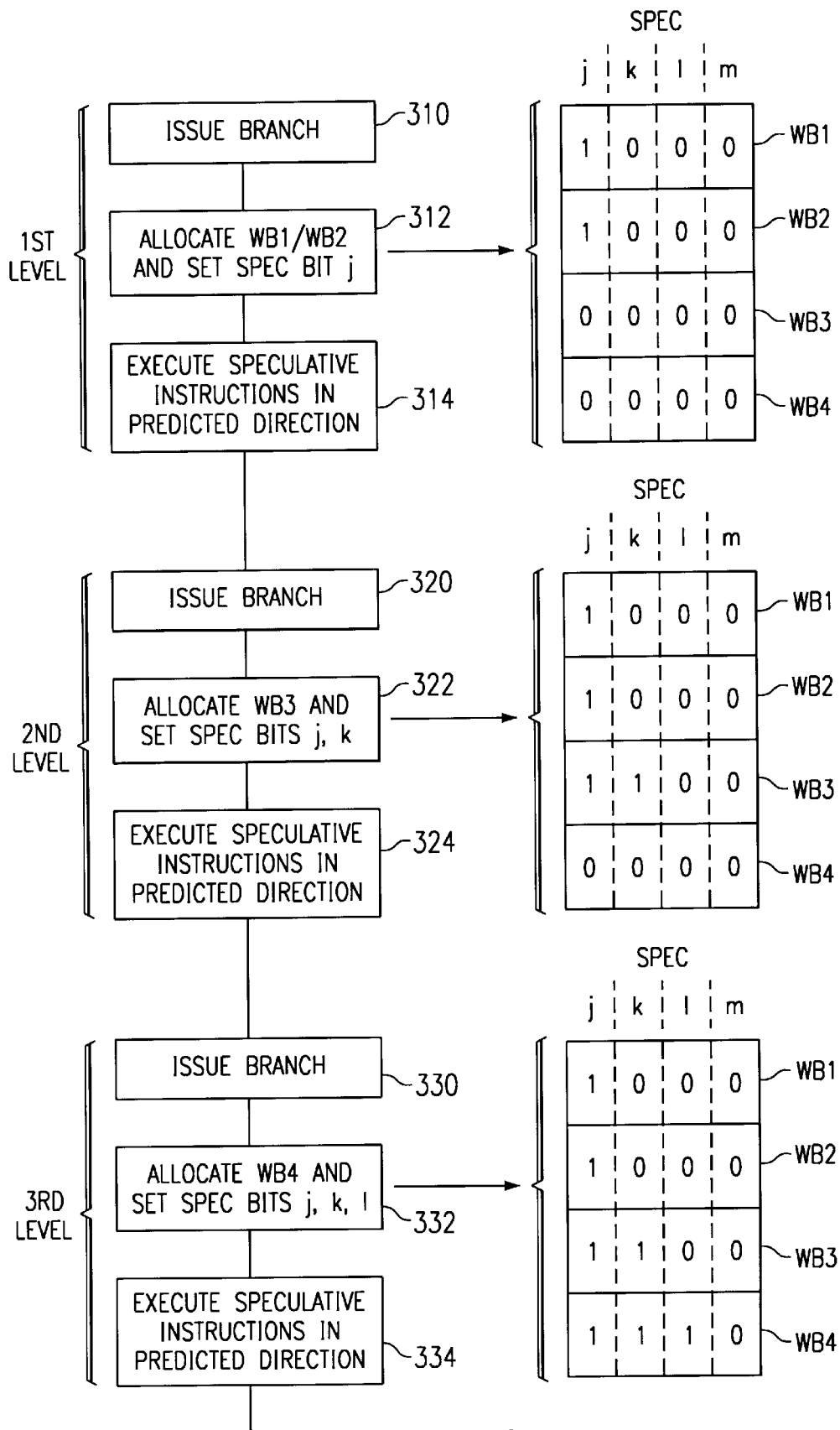
FIGS. 10a and 10b illustrate the function of the write buffers in connection with speculative execution, and in particular write buffer allocation and resolution (retire or invalidate) in storing and retiring speculative writes to memory.
Figure 10B:
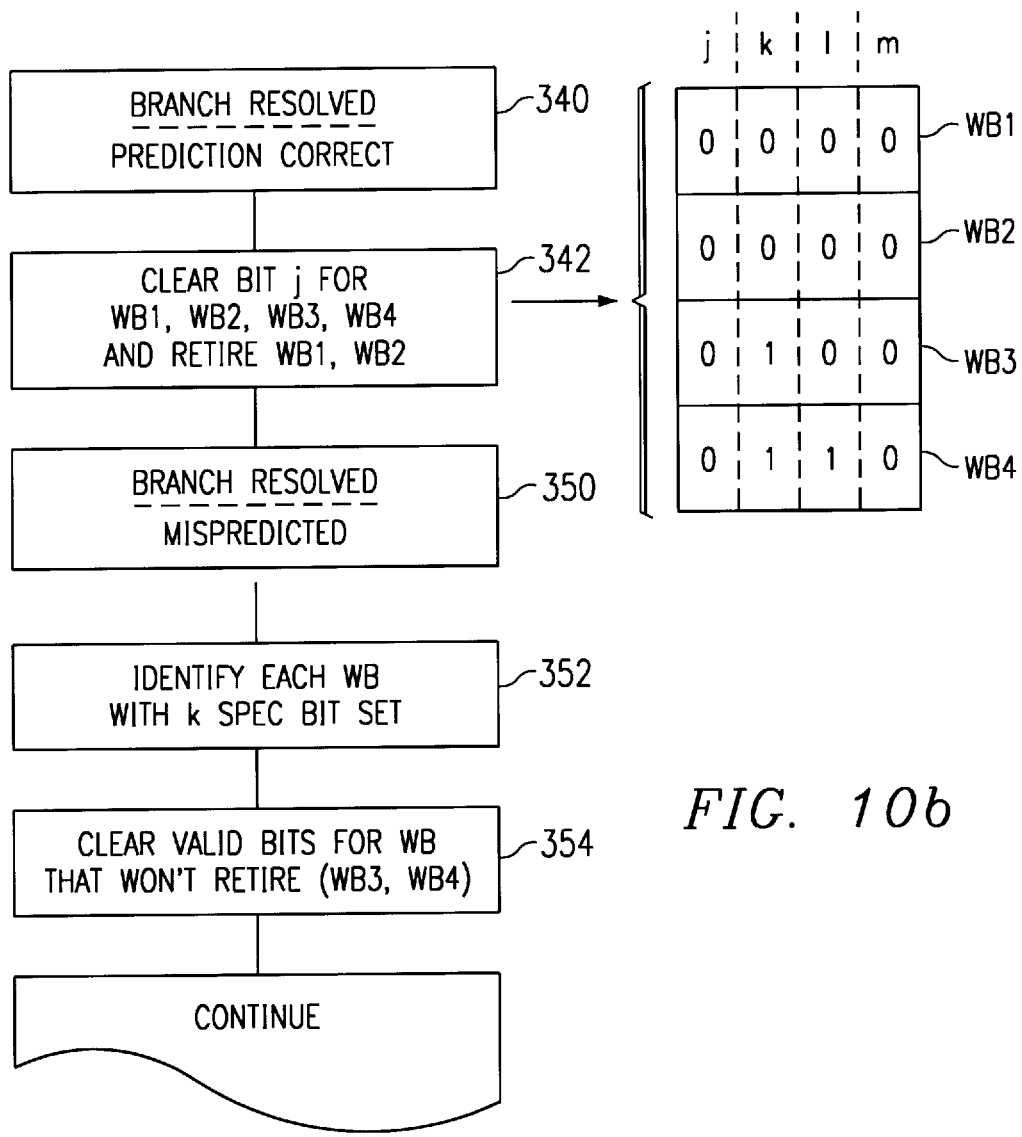

FIGS. 10a and 10b illustrate the operation of the write buffer speculation level logic in ensuring that the results of speculative writes are not retired to memory, and in removing the speculatively written data from the write buffer. Allocating speculative writes in the write buffers is discussed in this Section in connection with FIG. 10a—retiring speculative writes is discussed in Section 2.5.2. in connection with FIG. 10b.

A branch (speculation instruction) issues (310) from ID2 to AC, which allocates (312) in AC2 two write buffer entries WB1,WB2 (the speculatively issued instructions in the predicted direction performing two write operations to memory, in this example). However, because the write operations to write buffer entries WB1,WB2 are speculative, at least one of the speculation control bits of the SPEC [jklm] vector is set during allocation, depending upon the speculation level of the write.

Thus, write buffer entries WB1,WB2 have their SPEC [j] bit set (indicating first order speculation). Write buffer entries WB3,WB4 are not yet allocated, and as such their speculation control bits are clear.

Speculative instructions in the predicted direction are executed (314), which will, if completed, effect the writes to the allocated write buffer entries WB1,WB2. Because the execution of these writes is speculative, however, the retire sequence includes a gating decision preventing the retiring of a write buffer entry unless its SPEC bits are all clear, thereby preventing the results of speculative execution from being written to memory.

Second level speculation occurs with the issue (320) of another branch. Second level speculation means that in order for the execution of the speculatively issued instructions for this branch to be successful, not only must that prediction (320) be correct, but also the first prediction (310)

Following issue of the second level branch (320), write buffer entry WB3 is allocated (322) in AC2. Since any write to write buffer entry WB3 is of second level speculation, both the j and k SPEC control bits are set. Instructions in the predicted direction of the branch are then issued and executed (324).

A third level of speculation is illustrated with respect to the issue of another branch (330) in the predicted direction of the original branch (310) and the second level branch (320).

2.5.2. Floating Point Instructions

FIG. 8b illustrates a scheme for handling resolution of floating point speculation instructions.

The exemplary scheme takes into account a constraint in the exemplary implementation of the BPU that floating point speculation instructions will not be issued with branch speculation instructions outstanding (i.e., not yet resolved). In general, the exemplary scheme recognizes that floating point instructions can take significantly longer to resolve (i.e., complete without an exception) than a branch—stated differently, a number of branches may be able to resolve in the time it takes a floating point instruction to resolve.

Referring also to FIG. 8a, FIG. 8b illustrates the exemplary scheme for handling floating point instruction in the resolution buffer 152—by showing a sequence of speculation states of the speculation level control logic 156a–156n. The speculation level control logic controls the allocation of COFs and floating point instructions into the resolution buffers 152, and thereby the speculation level in the execution pipeline.

In state 156a, four branch speculation instructions B1–B4 have been issued with respective speculation levels 1–4. When B1 resolves, the speculation levels of the other outstanding branches B2–B4 decrement to B1–B3, and another branch may be issued from ID2 into the X-pipe as B4.

In state 156b, the new B1 resolve;, and the speculation levels for the other outstanding branches decrements, making room for a new branch B4. That is, the branch resolution buffers are operating as a circular queue.

In state 156c, a floating point instruction F1 is decoded—in accordance with the exemplary issue constraint for floating point speculation instructions, F1 will stall in ID2 as long as there are any outstanding (unresolved) branches. In states 156c and 156d, all of the outstanding branches resolve, and F1 issues from ID2 with speculation level 1.

In state 156f, three branches B2–B4 have issued from ID2 while F1 is still unresolved. B2 resolves such that the speculation levels for B3–B4 decrement to allow anther branch B4 to be issued.

In state 156g, a floating point instruction F2 is decoded, and branch B2 resolves (F1 is still unresolved). As shown is states 156g–156i, F2 stalls in ID2 until the outstanding branches have resolved.

In state 156j, all outstanding branches have resolved, and F2 issues with speculation level 2 (F1 is still unresolved). Now two branches B3–B4 may issue with F1 and F2 outstanding.

In state 156k, branch B3 resolves, such that branch B4 decrements and a new branch B4 may be issued.

In state 156m, F1 resolves. F2 decrements to speculation level F1, and the outstanding branches correspondingly decrement to B2–B3. In state 156n, a new branch B4 issues. Note that the state 156n is the same as the state 156g (i.e., one floating point speculation instruction outstanding with speculation level 1, and three subsequent branches outstanding with speculation levels B2–B4.

2.5.3. COF Resolution

A COF is resolved when its actual target address has been calculated (AC1), and, in the case of branches, conditional dependencies determined to resolve (EX or WB) direction prediction. A floating point instruction is resolved when it completes execution without faulting. For the exemplary embodiment, COF instructions are resolved in instruction order (COFs are allowed to resolve even though floats are outstanding).

Branches are resolved by resolving both the predicted target address and predicted direction. Thus, for BPU hits, the predicted target linear address is compared in AC2 time to the actual target linear address calculated in AC1, and then the predicted direction is compared to the actual direction in EX/WB. For BPU misses (either dynamically or statically predicted not-taken), only the direction needs to be resolved in EX/WB.

UCOFs are validated through comparison of the predicted and actual target address in AC2. While no direction resolution is required, to maintain resolution order, resolution also requires that all outstanding COFs ahead of the UCOF be resolved. Far COFs also compare modes, and in the implementation where far segment limits are stored, segment limits (see, Section 2.3.4.1).

Referring to FIG. 8, if a COF or float is resolved such that repair is not required, resolution control 154 broadcasts to the AC and EX pipe stages and the write buffers 29 a resolution vector. This vector includes two fields:

| Deallocate | D[1:0] Index |
| --- | --- |

This resolution vector causes each pipe stage to deallocate one of four checkpoint registers, with the D Index identifying the checkpoint register to deallocate.

FIG. 10b illustrates a branch speculation instruction being resolved with a correct prediction (340), allowing write buffer entries WB1,WB2 to be retired to memory. Thus, the SPEC [j] bit of all speculative write buffer entries WB1–WB4 are cleared (342). Since write buffer entries WB1,WB2 now have all of their speculation control bits SPEC [jklm] clear, these write buffer entries may be retired to memory.

2.5.4. Pipeline Repair

Pipeline repair after a branch (or UCOF) misprediction or floating point exception requires flushing the execution pipeline behind the checkpointed speculation instruction, and then restoring the checkpointed physical registers to recover the processor state. The exemplary microprocessor accomplishes repair from a mispredicted branch in a single clock.

Referring to FIG. 8, resolution logic 150 effects a pipeline repair of a speculation error by broadcasting to the AC and EX pipe stages, and the write buffers 29, the pipeline repair vector 192 the pipeline repair vector has three fields

| SPEC [3:0] | Repair | R[1:0] Index |
| --- | --- | --- |

The pipeline repair vector instructs the AC and EX pipe stages to flush the current instruction, and restore from the indexed checkpoint register. In addition, the 4 bit SPEC vector is used by the write buffer speculation level logic 29a to adjust its SPEC status, invalidating those writes affected by the speculation error. A repair after a floating point exception will typically require flushing the entire execution pipeline (due to latency), while for a mispredicted branch there may be a paired instruction in EX and two instructions in WB that would be allowed to complete.

A special case of a repair is for a target mismatch. For either predicted taken branches or UCOFs, if a comparison of the predicted target address with the actual target address calculated in AC1 indicates a mismatch, the BPU will immediately signal to AC a target mismatch with the target mismatch repair vector—instructions in EX and WB will be allowed to complete execution. This vector has two fields:

| TMM | SPEC [3:0] |
| --- | --- |

The target mismatch vector instructs AC to flush the current instruction, and to adjust its speculation status accordingly using the 4 bit SPEC vector.

A similar special case of a repair is for a mode mismatch when the modes for a far COF are predicted. Analogous to a target mismatch, a mode mismatch vector is broadcast to instruct AC to flush the current instruction, and to adjust its speculation status accordingly using a 4 bit SPEC vector.

Referring to FIG. 9, checkpoint restore is accomplished by copying the Checkpoint register 218 associated with the branch or floating point instruction to the current register, restoring the state of the IP/SP and the physical registers to the state which existed immediately prior to the speculation instruction.

FIG. 10b illustrates the affect of a repair on speculative writes in the write buffers that result from the second and third level branch instructions when the second level branch (320) is mispredicted. Detecting a mispredicted branch (350) means that if the writes to the allocated write buffer entries WB3,WB4 have not yet been performed, these writes will never be performed. If these writes have been performed (i.e., these write buffer entries are pending), the data should not be written to memory. Accordingly, write buffer entries WB3,WB4 must be cleared for additional use, without retiring their contents to memory.

Those write buffer entries identified (346) as having their SPEC [k] bit set are entries WB3 (second level speculation) and WB4 (third level speculation). The valid bits for these entries are cleared (354), such that entries WB3,WB4 may be reallocated, and will not be retired. Retire pointers point to the ones of write buffer entries WB1–WB4 next to be retired, such that when the associated retire pointer points to entries WB3,WB4, these entries will be skipped (as though they were never allocated). This allows the retire pointers to "catch up" to the allocation pointers if their section of write buffer is empty. Repeated checking of the valid bits in the retire process can then safely stop, once the empty condition has been met.

3. Conclusion

Although the Detailed Description of the invention has been directed to certain exemplary embodiments, various modifications of these embodiments, as well as alternative embodiments, will be suggested to those skilled in the art. For example, while the exemplary embodiment of the invention is implemented for a prefetch unit using split prefetching that receives target addresses from the branch processing unit at prefetch time and from the AC stage of the execution pipeline, the invention has general application to generating prefetch addresses where the time within a clock period (or other period of time) available to generate a prefetch address differs based on the source of address information from which the address can be generated. Also, specific register structures, mappings, bit assignments, and other implementation details are set forth solely for purposes of providing a detailed description of the invention.

Logic is generally used in the hardware sense, recognizing that implementations involving microcode or other software routines would be equivalent. Cache organization (set associative/direct mapped) is a design choice.

Various modifications based on trade-offs between hardware and software logic will be apparent to those skilled in the art. Also, the specific address nomenclature (linear address, effective address, segment base, relative base, etc.) is conventional for the x86 architecture, and is used for the purpose of describing the exemplary embodiment only.

The invention encompasses any modifications or alternative embodiments that fall within the scope of the claims.

I claim:

1. In a pipelined processor, a prefetch unit that performs split prefetching by generating low and high prefetch addresses in a single clock, where the high prefetch address is generated from the low prefetch address, and where the low prefetch address is supplied to the prefetch unit from different pipe stages, comprising:
    (a) prefetch request logic in the prefetch unit, responsive to a low prefetch address, to selectively issue prefetch requests for transferring a predetermined number of instruction bytes to the prefetch unit;
    (b) low/high incrementation logic in the prefetch request logic that increments the low prefetch address to generate the high prefetch address such that the low and high prefetch addresses are issued as a single prefetch request in the same clock; and
    (c) at least one pipe stage that supplies a low prefetch address to the prefetch unit with sufficient delay within a clock period that not enough time remains for the low/high incrementation logic to generate the high prefetch address in such clock period;
    (d) such that when the low prefetch address is supplied to the prefetch unit by such at least one pipe stage, the prefetch request logic generates the prefetch request consisting of only the low prefetch address in the clock in which it receives the low prefetch address.

2. The prefetch unit of claim 1, wherein the high prefetch address is generated by adding an n-bit value equal to $2^n$ to the low prefetch address, and wherein:
    (a) for low prefetch addresses supplied by the at least one pipe stage, the low/high incrementation logic detects whether the low prefetch address has a [0] in bit position n;
    (b) if so, the low/high incrementation logic generates the high prefetch address by toggling the bit position n to a [1].

3. The prefetch unit of claim 1, wherein the pipelined processor includes at least prefetch, decode, and address calculation pipe stages, and wherein the at least one pipe stage is the address calculation pipe stage.

4. In a pipelined processor, a prefetch unit that performs split prefetching by generating low and high prefetch addresses in a single clock, where the high prefetch address is generated from the low prefetch address, and where the low prefetch address is supplied to the prefetch unit from different pipe stages, comprising:
    (a) prefetch request means for selectively issuing, in response to a low prefetch address, prefetch requests for transferring a predetermined number of instruction bytes to the prefetch unit;
    (b) low/high incrementation means for incrementing the low prefetch address to generate the high prefetch address such that the low and high prefetch addresses are issued as a single prefetch request in the same clock; and
    (c) at least one pipe stage that supplies a low prefetch address to the prefetch request means with sufficient delay within a clock period that not enough time remains for the low/high incrementation means to generate the high prefetch address in such clock period;
    (d) such that, when the low prefetch address is supplied to the prefetch unit by such at least one pipe stage, the prefetch request means generates the prefetch request consisting of only the low prefetch address in the clock in which it receives the low prefetch address.

5. The prefetch unit of claim 4, wherein the high prefetch address is generated by adding an n-bit value equal to $2^n$ to the low prefetch address, and wherein:
    (a) for low prefetch addresses supplied by the at least one pipe stage, the low/high incrementation means detects whether the low prefetch address has a [0] in bit position n; and
    (b) if so, the low/high incrementation means generates the high prefetch address by toggling the bit position n to a [1].

6. The prefetch unit of claim 4, wherein the pipelined processor includes at least prefetch, decode, and address calculation pipe stages, and wherein the at least one pipe stage is the address calculation pipe stage.

7. A method of performing split prefetching by generating low and high prefetch addresses in a single clock, where the high prefetch address is generated from the low prefetch address, used in a pipelined processor where the low prefetch address is supplied by different pipe stages, comprising the steps:
    (a) selectively issuing, in response to a low prefetch address, prefetch requests for transferring a predetermined number of instruction bytes to the prefetch unit;
    (b) incrementing the low prefetch address to generate the high prefetch address such that the low and high prefetch addresses are issued as a single prefetch request in the same clock; and
    (c) supplying, from at least one pipe stage, a low prefetch address with sufficient delay within a clock period that not enough time remains to generate the high prefetch address in such clock period; and
    (d) when the low prefetch address is supplied by such at least one pipe stage, generating the prefetch request consisting of only the low prefetch address in the clock in which the low prefetch address is supplied.

8. The method of performing split prefetching of claim 7, wherein the high prefetch address is generated by adding an n-bit value equal to $2^n$ to the low prefetch address, further comprising the steps:
    (a) for low prefetch addresses supplied by the at least one pipe stage, detecting whether the low prefetch address has a [0] in bit position n; and
    (b) if so, generating the high prefetch address by toggling the bit position n to a [1].

9. The method of performing split prefetching of claim 1, wherein the pipelined processor includes at least prefetch, decode, and address calculation pipe stages, and wherein the at least one pipe stage is the address calculation pipe stage.

* * * * *